United States Patent
Hosenpud et al.

(10) Patent No.: US 10,257,500 B2
(45) Date of Patent: Apr. 9, 2019

(54) STEREOSCOPIC 3D WEBPAGE OVERLAY

(71) Applicant: zSpace, Inc., Sunnyvale, CA (US)

(72) Inventors: Jonathan J. Hosenpud, San Francisco, CA (US); Clifford S. Champion, San Jose, CA (US)

(73) Assignee: zSpace, Inc., Sunnyvale, CA (US)

( * ) Notice: Subject to any disclaimer, the term of this patent is extended or adjusted under 35 U.S.C. 154(b) by 4 days.

(21) Appl. No.: 15/406,390

(22) Filed: Jan. 13, 2017

(65) Prior Publication Data
US 2018/0205939 A1 Jul. 19, 2018

(51) Int. Cl.
*G06F 3/033* (2013.01)
*H04N 13/275* (2018.01)
*G06T 11/60* (2006.01)
*G06F 3/0354* (2013.01)

(52) U.S. Cl.
CPC ....... *H04N 13/275* (2018.05); *G06F 3/03542* (2013.01); *G06T 11/60* (2013.01)

(58) Field of Classification Search
CPC ........ G06F 3/03–3/04897; G06T 19/20; G06T 11/60; G06T 15/04; H04N 13/275
USPC .......................... 345/173–183; 715/848–852
See application file for complete search history.

(56) References Cited

U.S. PATENT DOCUMENTS

| | | | |
|---|---|---|---|
| 6,362,817 B1 | 3/2002 | Powers et al. | |
| 7,467,356 B2 | 12/2008 | Gettman et al. | |
| 8,232,990 B2 | 7/2012 | King et al. | |
| 2009/0303231 A1 | 12/2009 | Robinet et al. | |
| 2011/0164029 A1* | 7/2011 | King .................... | G06F 3/04883 345/419 |
| 2012/0002024 A1 | 1/2012 | Choi et al. | |
| 2012/0113095 A1 | 5/2012 | Hwang et al. | |
| 2012/0229450 A1 | 9/2012 | Kim | |
| 2014/0143733 A1 | 5/2014 | Jung et al. | |
| 2016/0004335 A1* | 1/2016 | Hosenpud ............. | G06F 3/0346 345/157 |
| 2016/0080717 A1 | 3/2016 | Reiss et al. | |
| 2016/0203744 A1 | 7/2016 | Duffy | |
| 2017/0032562 A1 | 2/2017 | Block | |

OTHER PUBLICATIONS

U.S. Appl. No. 15/406,440, entitled "Transitioning Between 2D and Stereoscopic 3D Webpage Presentation", by Jonathan J. Hosenpud and Clifford S. Champion, filed on Jan. 13, 2017, 76 pages.

* cited by examiner

*Primary Examiner* — Amr A Awad
*Assistant Examiner* — Aaron Midkiff
(74) *Attorney, Agent, or Firm* — Meyer Hood Kivlin Kowert & Goetzel, P.C.; Jeffrey C. Hood; Brian E. Moore

(57) ABSTRACT

Systems and methods for displaying a stereoscopic three-dimensional (3D) webpage overlay. In some embodiments, user input may be received from a user input device and in response to determining that the user input device is not substantially concurrently interacting with the 3D content, interpret the user input based on a 2D mode of interaction. In addition, the user input may be interpreted based on a 3D mode of interaction in response to determining that the user input device is substantially concurrently interacting with the 3D content. The 2D mode of interaction corresponds to a first visual cursor, such as a mouse cursor, and the 3D mode of interaction corresponds to a second visual cursor, such as a virtual beam rendered to extend from a tip of the user input device.

20 Claims, 27 Drawing Sheets

STEREOSCOPIC 3D WEBPAGE OVERLAY

TECHNICAL FIELD

This disclosure relates to the field of digital display and more particularly to methods and systems for displaying a stereoscopic three-dimensional (3D) webpage overlay.

DESCRIPTION OF THE RELATED ART

Three-dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, there are two images for each video frame: right and left. The right image must be delivered to only an observer's right eye, and the left image must be delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS switch may be placed between the display panel and the viewer, as shown in FIG. 2A. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 2B. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 2B further shows, the system includes stereoscopic eyewear that is designed such that the left lens will only pass the left state polarization and the right lens will only pass the right state polarization. In this way, separation of the right and left images is achieved.

The second conventional architecture uses stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth, as shown in FIG. 4. Virtual objects may be displayed in this created 3D space, which exists both above the 3D stereoscopic display panel (i.e., negative space) and below the stereoscopic display panel (i.e., positive space).

SUMMARY

Various embodiments of a system for implementing methods for displaying a stereoscopic three-dimensional (3D) webpage overlay. The system may include one or more displays and at least one processor coupled to the one or more displays. In some embodiments, the one or more displays and at least one processor may be comprised in a head mounted display system. In some embodiments, the system may further include a user input device, such as a stylus, communicatively coupled to the at least one processor and a memory coupled to the at least one processor. The processor may be configured to perform or implement embodiments of the techniques disclosed herein. Additionally, a method implementing embodiments of the techniques may be implemented on a computer or stored as program instructions on a computer readable memory medium.

In some embodiments, a processor may be configured to receive user input from a user input device and in response to determining that the user input device is not substantially concurrently interacting with the 3D content, interpret the user input based on a 2D mode of interaction. In addition, the processor may be configured to interpret the user input based on a 3D mode of interaction in response to determining that the user input device is substantially concurrently interacting with the 3D content. In some embodiments, the 2D mode of interaction corresponds to a first visual cursor, such as a mouse cursor, and the 3D mode of interaction corresponds to a second visual cursor, such as a virtual beam rendered to extend from a tip of the user input device. In some embodiments, the processor may be further configured to track, via a tracking system, position and/or orientation of the user input device relative to the surface of the display device and determine an intersection of the virtual beam extending from a tip of the user input device with the surface. The intersection may be based on the position and orientation of the user input device.

In some embodiments, a processor may be configured to render, on a surface of a display device, a webpage comprising one or more layers, wherein a first layer is associated with three-dimensional (3D) content, and wherein a second layer is associated with two-dimensional content, receive user input from a user input device, and in response to determining that the user input device is substantially concurrently interacting with the 3D content, modify at least one of a plurality of render properties associated with of the 3D content. In some embodiments, the at least one render property may be incrementally modified over a specified period of time, thereby animating modification of the at least one render property.

BRIEF DESCRIPTION OF THE DRAWINGS

A better understanding of the present disclosure can be obtained when the following detailed description of the preferred embodiment is considered in conjunction with the following drawings, in which.

Figure 1:
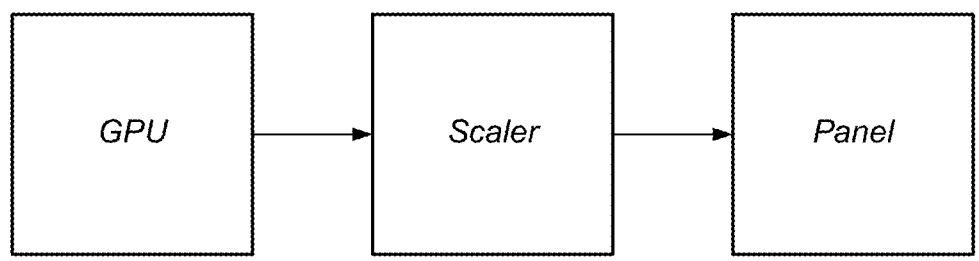
FIG. 1 illustrates a modern display chain, according to the prior art.
Figure 2A:
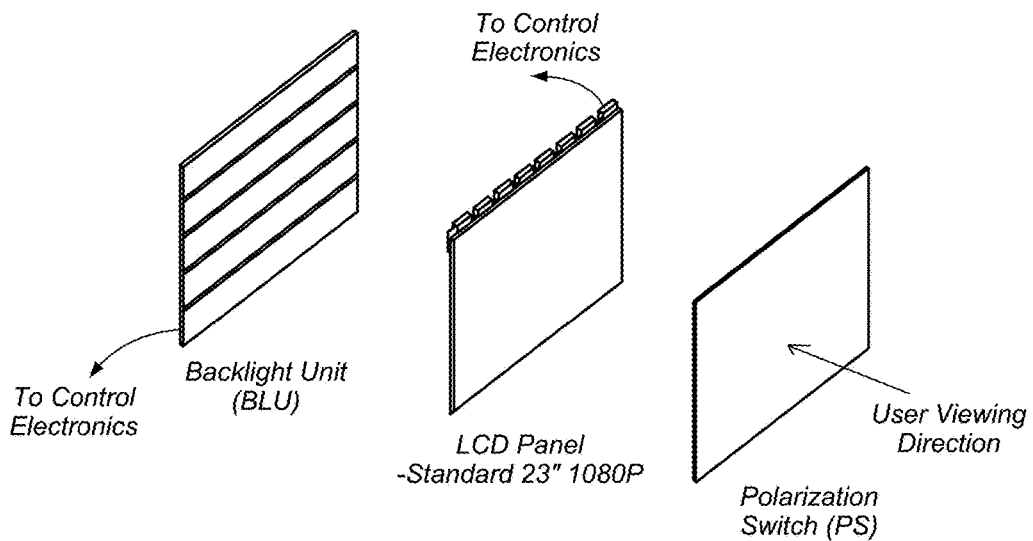
FIG. 2A illustrates an example of an architecture that utilizes a polarization switch, according to the prior art.
Figure 2B:
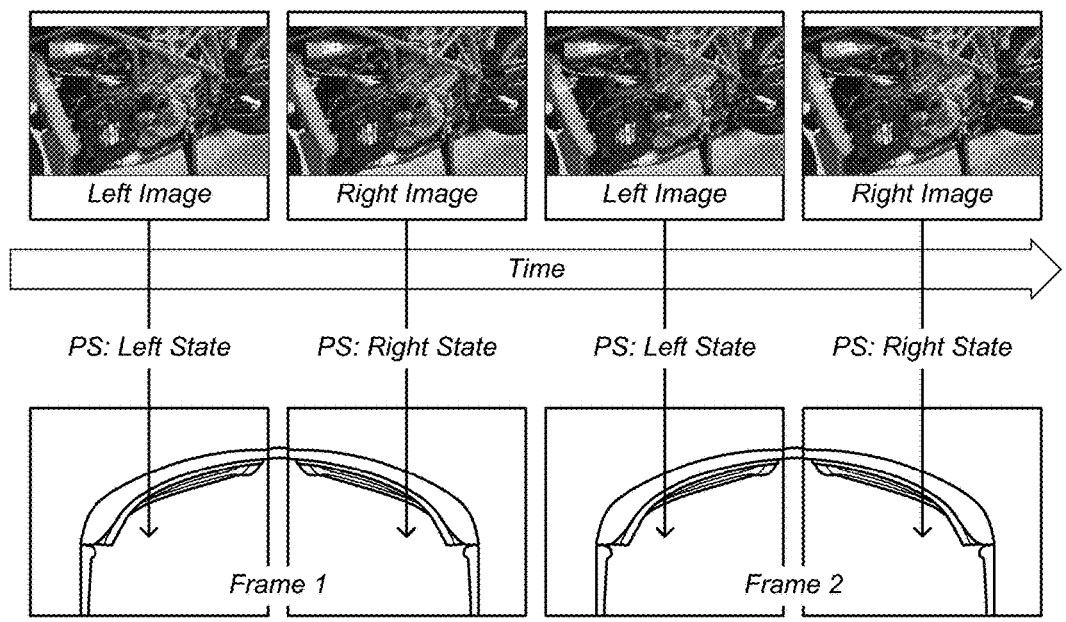
FIG. 2B illustrates an example of a stereo effect (simulated 3D) using polarization switching between left and right views, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element (or Functional Unit)—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Figure 4:
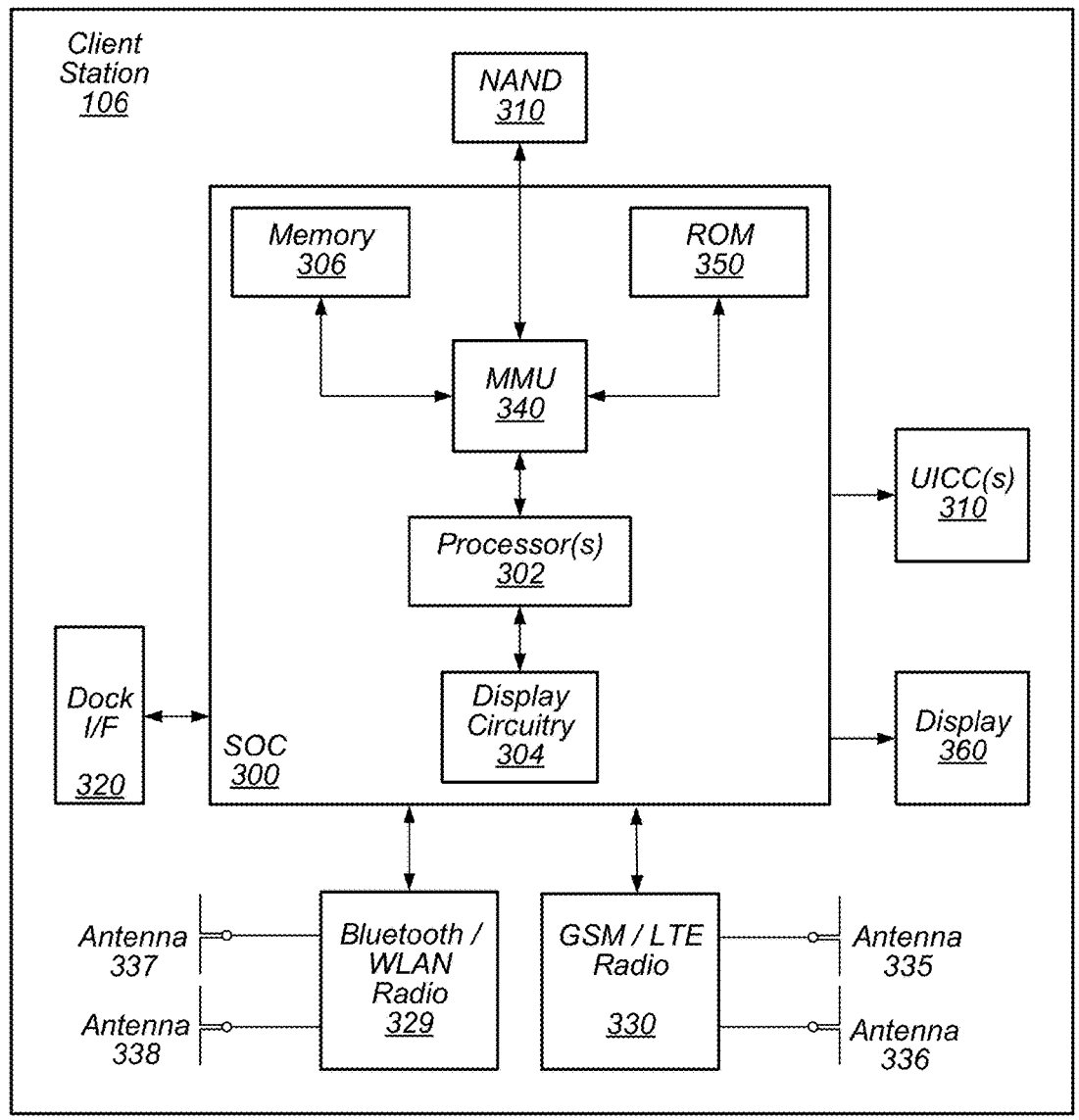
FIG. 4 illustrates an example block diagram of a user equipment device configured according to some embodiments.

Coupled Zone—refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers the display of a 3D object, or content, on a two-dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45-degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Stylus—a peripheral device or element such as a handheld device, handheld pen device, handheld pointing device, hand, finger, glove, or any object used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including."". As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIGS. 3-6 Exemplary Systems

Figure 3:
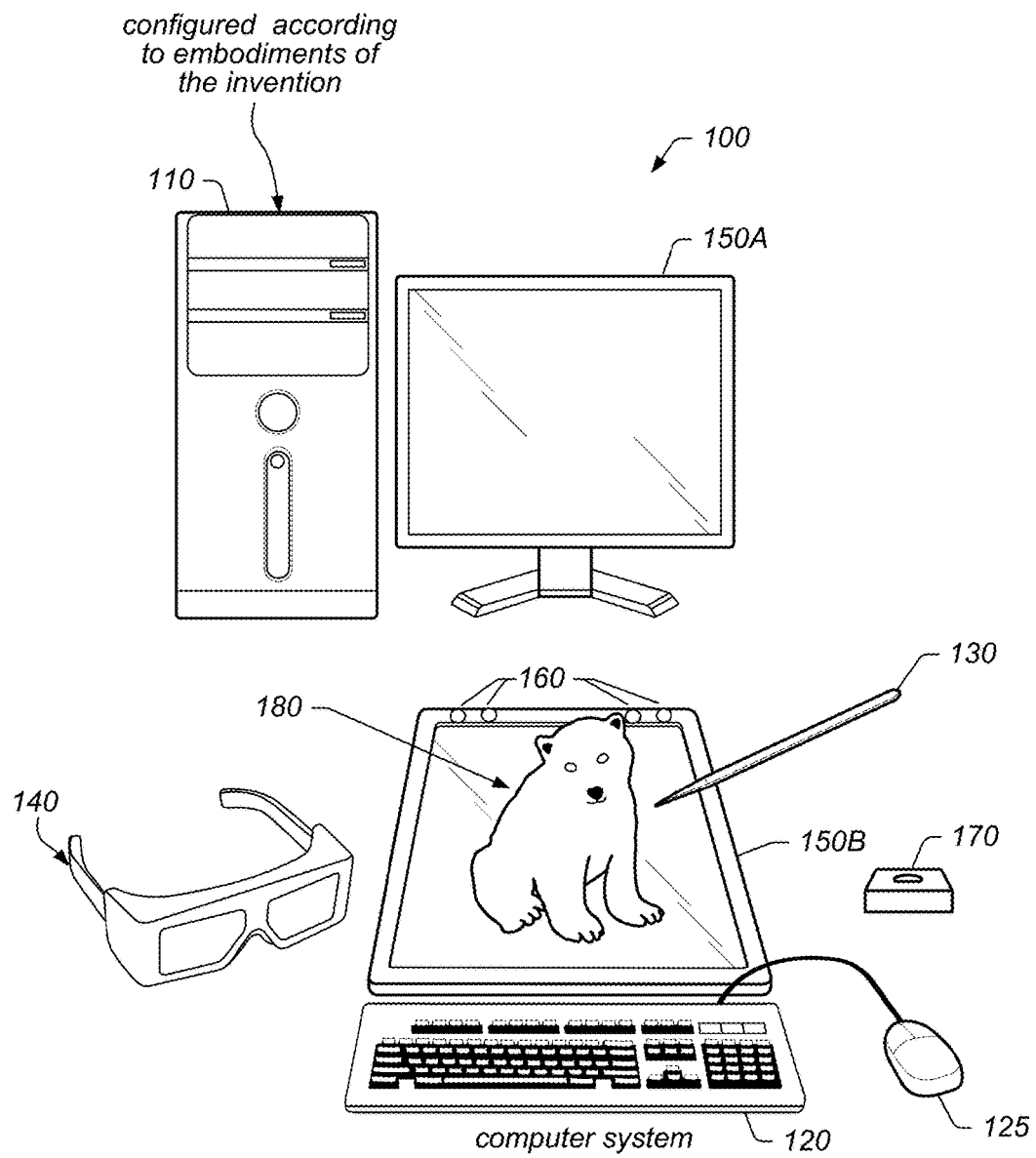
FIG. 3 illustrates an example 3D stereoscopic display system configured according to some embodiments.

FIG. 3 illustrates an exemplary system configured to implement various embodiments of the techniques described below.

In the exemplary embodiment of FIG. 3, computer system 100 may include chassis 110, display 150A and display 150B (which may collectively be referred to as display 150 or "one or more displays" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three-dimensional (3D) scene (e.g., via stereoscopic images), or 3D content, such as scene 180, using the display 150A and/or the display 150B. The computer system 100 may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of Figure is exemplary only, and other numbers of displays are also envisioned. For example, the computer system 100 may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two-dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 3 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used in conjunction with other positional information of the system (e.g., an accelerometer and/or gyroscope within the stylus itself) to perform more precise 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 170 to store user input device 130. Caddy 170 may also be used to calibrate the orientation of the stylus to a known roll, pitch, and yaw, and so may be in a fixed position relative to cameras 160.

In one embodiment, the system 100 may be configured to couple to a network, such as a wide area network, via an input. The input may be configured to receive data (e.g., image data, video data, audio data, etc.) over the network from a system similar to system 100. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110 to determine a position or a POV, e.g., via execution of one or more programs by or on a processor or functional unit of chassis 110, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110.

Thus, the system 100 may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100 may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100 is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100) may be used as desired.

According to various embodiments of the present disclosure, the display module 230 may display various types of information (for example, multimedia data or text data) to be provided to the user. The display module 230 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display module 230 may be connected functionally to an element(s) of the electronic device. Also, the display module 230 may be connected functionally to an electronic device(s) other than the electronic device. According to various embodiments of the present disclosure, the input module 240 may receive an input for controlling an attribute of, for example, a history screen. The input module 240 may receive, for example, an input of 'reference screen setting'. 'Reference screen setting' may involve an operation for storing information related to the screen in the storage module 210 in order to display the reference screen. The input module 240 may receive, for example, an input for displaying the reference screen. Attributes of the screen may include, for example, at least one of the position of the reference screen, a sound volume for the reference screen, brightness of the screen, and the size of the screen. If the input module 240 is included in a second electronic device, the input module 240 may not be provided in the electronic device according to various embodiments of the present disclosure.

FIG. 4 illustrates an example simplified block diagram of a wireless station 106. According to embodiments, wireless station 106 may be a user equipment (UE) device, a mobile device and/or mobile station. Wireless station 106 may be used in conjunction with the system described above in reference to FIG. 4 and the systems described below in reference to FIGS. 5B and 5C. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a Wi-Fi, Bluetooth, or Bluetooth low energy connection) or via a wired interface such as a universal serial bus interface, among other wired interfaces.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The wireless station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as system 100 described above and/or systems 500A and 5B described below. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 5A:
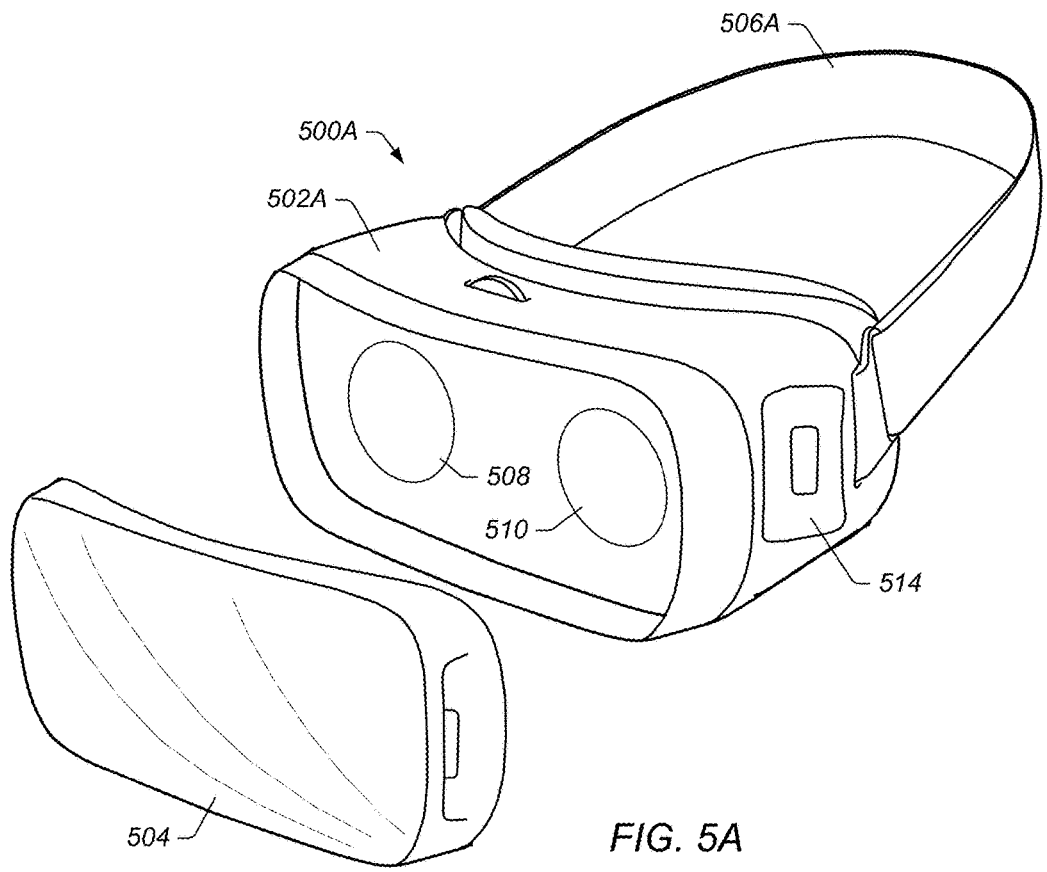
FIGS. 5A and 5B illustrate examples of a 3D head-mounted stereoscopic display system configured according to some embodiments.

Referring to FIG. 5A, a head-mounted electronic device 500A may include a body 502A and a cover 504. The body 502 may include lenses 508 and 510, and a control device 514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500B may include a display, such as display 150A or 150B described above in reference to FIG. 4. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

Figure 5B:
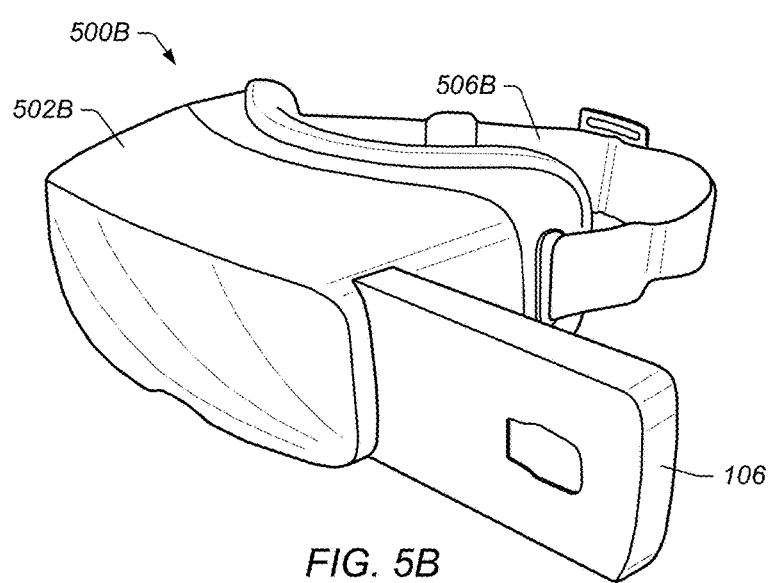

Turning to FIG. 5B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B.

Figure 5C:
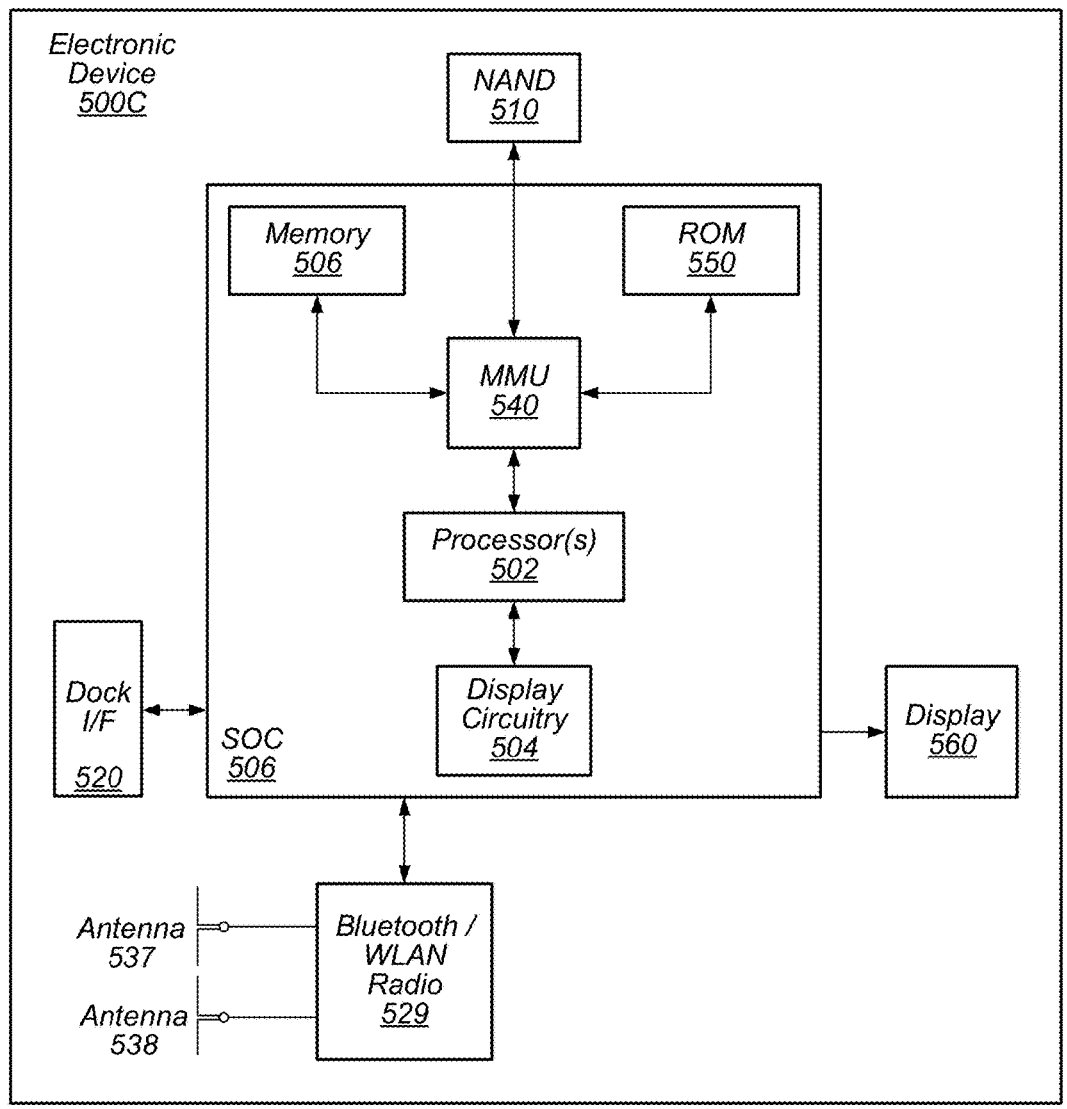
FIG. 5C illustrates an example block diagram of a head-mounted electronic device configured according to some embodiments.

Turning to FIG. 5C, FIG. 5C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

As described herein, the electronic device 500C may include hardware and software components for implementing the features described herein, e.g., the electronic device 500C may form at least part of a 3D display system such as system 100 described above and/or systems 500A and 5B described below. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE 106, in conjunction with one or more of the other components 500, 504, 506, 510, 520, 535, 550, 560 may be configured to implement part or all of the features described herein.

In some embodiments, electronic device 500C may include or be in communication with one or more external cameras. For example, electronic device 500C may include (or be in communication with) one or more cameras (or an array of cameras) that may be configured to capture images of a physical location of a user.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 6:
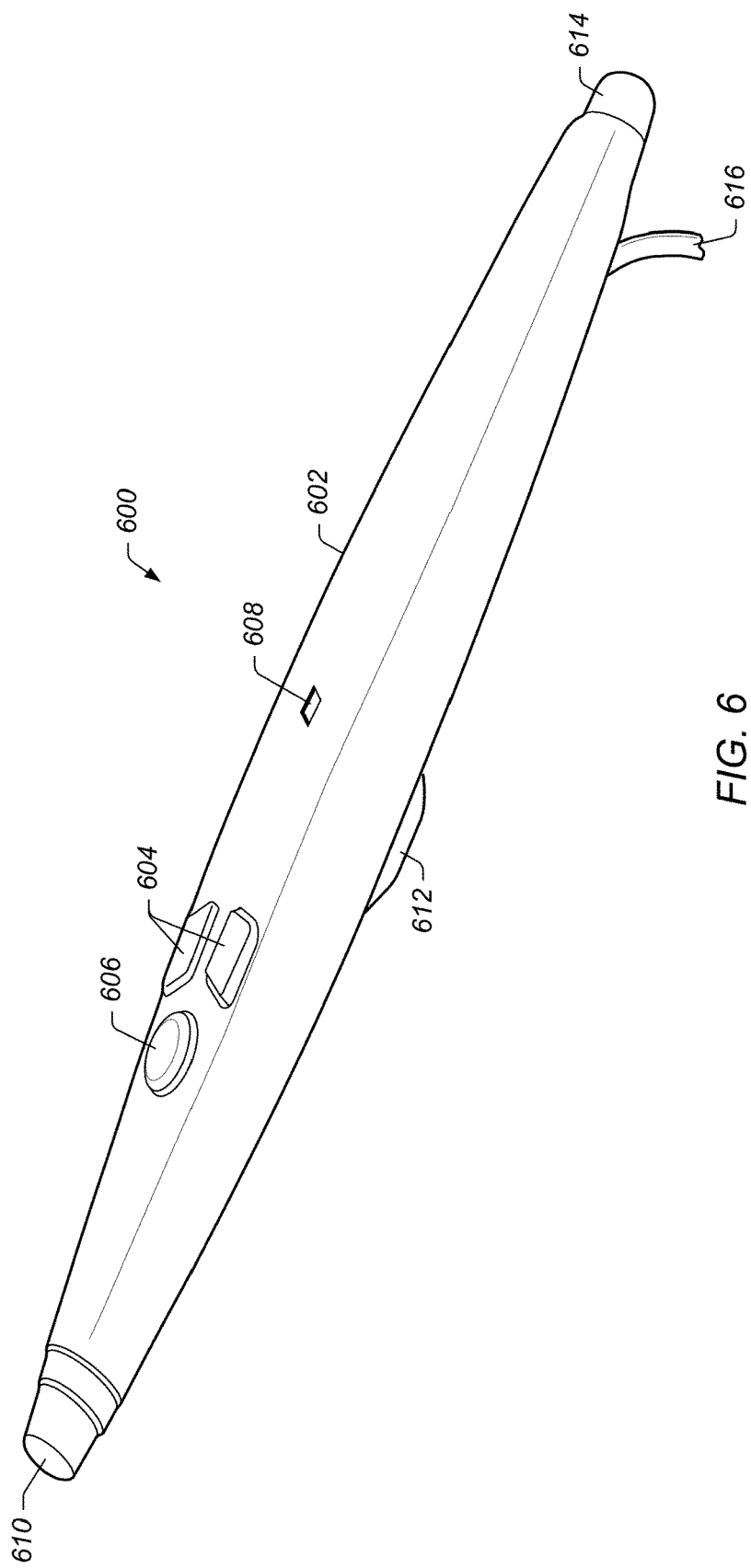
FIG. 6 illustrates an example of a user input device, according to some embodiments.

FIG. 6 illustrates an example of a user input device, according to some embodiments. As shown, a user input device 600 may be configured to perform various embodiments as described herein. User input device 600 may be similar to or the same as user input device 130 as described above in reference to FIGS. 4 and 5B-5C. Thus, user input device 600 may be used in conjunction with, or be included in, system 100 or systems 500 and 550. As described above, systems 100, 500, and 550 may have the capability to determine the six axis position and orientation of user input device 600. Note that this includes the X, Y, Z location of tip 610 of user input device 600 and the α, β, γ angular orientation of body 602 of user input device 600. However, it should be further noted that user input device 600 is exemplary, and that other user input devices, suitably configured, may be used as desired.

As shown, user input device 600 may include buttons 604, 606, and 612. One of the buttons, such as button 606, may be depressed and held down to trigger the selection of an object within a 3D scene presented by any of systems 100, 500, and 550. Additionally, system 100 may be configured to display a virtual "laser like" projection from tip 610 to the selected object. With the object selected, adjustment of the position and/or orientation of user input device 600 may change the position and/or orientation of the object. Thus, movements of the user input device 600 may result in corresponding translations and/or rotations of the object.

Stereoscopic 3D Webpage Overlay

In existing implementations, webpages have predominantly revolved around presenting two-dimensional (2D) content, e.g., text, images, videos, and so forth, to end users. However, the introduction of the hypertext markup language (HTML) canvas element and Web Graphics Library (WebGL) has enabled webpages to present three-dimensional (3D) content as well.

In some implementations, 3D content may be presented on a webpage by using a fixed sized WebGL canvas with an absolute position that may be treated like any other HTML element used on the webpage, e.g., such as an image and/or text element. The fixed sized WebGL canvas does not generally span across the entire extent of browser's viewport (viewable display window) and may scroll with other content on the webpage.

In some implementations, multiple WebGL canvases can be created to present different sets of 3D content, however the WebGL canvases will be completely independent from one another. For example, if a sphere is rendered in WebGL canvas A and a cube is rendered in WebGL canvas B, there is no way for the sphere to interact with or properly occlude the cube (and vice versa).

In some implementations, 3D content may be presented on a webpage by using a full screen WebGL canvas that covers the extents of the browser's viewport and/or the entire display. Generally, in such implementations, all 2D content (e.g., text and image elements) on the webpage is occluded and cannot be seen and/or interacted with by the end user.

In existing implementations (e.g., as described above) WebGL canvases are effectively implemented as a viewport into a 3D virtual world that is completely isolated from the rest of the 2D content in its associated webpage. In other words, the 2D and 3D content are separate and distinct from one another. Thus, there are limitations in how 3D content interacts with the rest of the webpage (e.g., with the 2D content). For example, 3D content such as models cannot be dragged out of and/or across the page on top of 2D content. As another example, 3D geometry including the visual representation of a 6 degree-of-freedom (6-DOF) user input device's cursor, e.g., such as a virtual stylus beam, cannot be rendered on top of and/or interact with 2D content.

Embodiments described herein provide mechanisms (e.g., systems and methods) for integration of 3D content with 2D content within a webpage, e.g., such that the boundaries of isolation described above are removed.

3D Webpage Overlay

In some embodiments, one or more layout properties of a WebGL canvas may be specified to allow for integration of 3D content with 2D content within a webpage. For example, a WebGL canvas may be specified such that the WebGL canvas spans an entire viewport of a web browser, e.g. width and height of the WebGL canvas specified at 100% width and height of a web browser viewport. In some embodiments, the WebGL canvas may be specified as having a fixed position, e.g., to prevent the WebGL canvas from scrolling with the webpage. In some embodiments, input events may be ignored such that a user input device (e.g., such as user input device 130 and/or a mouse) may be able to interact with 2D content behind the WebGL canvas). In some embodiments, whether input events are disregarded may be dependent on whether interaction with 3D content (e.g., the WebGL canvas) or 2D content is expected and/or anticipated, e.g., based (at least in part) on whether the user input device is (substantially) currently interacting with the 3D content. In other words, input events may be dynamically enabled/disabled for the WebGL canvas depending on whether the user input device is intersecting (or interacting with) 3D content or not (respectively). In some embodiments, the WebGL canvas may be specified with a relatively large z-index value (e.g., to guarantee the WebGL canvas is rendered on top of or in from of all other rendered content). In some embodiments, the WebGL canvas may be specified with a transparent background (e.g., to allow the WebGL canvas to be overlaid on top of or in front of rendered 2D content and still retain visualization of the rendered 2D content). In some embodiments, the WebGL canvas may be specified as full screen such that a virtual beam associated with the user input device may be rendered to appear that the virtual beam is interacting with the web browser's user interface and scrollbars (anything outside of the browser's client viewport area).

Figure 7:
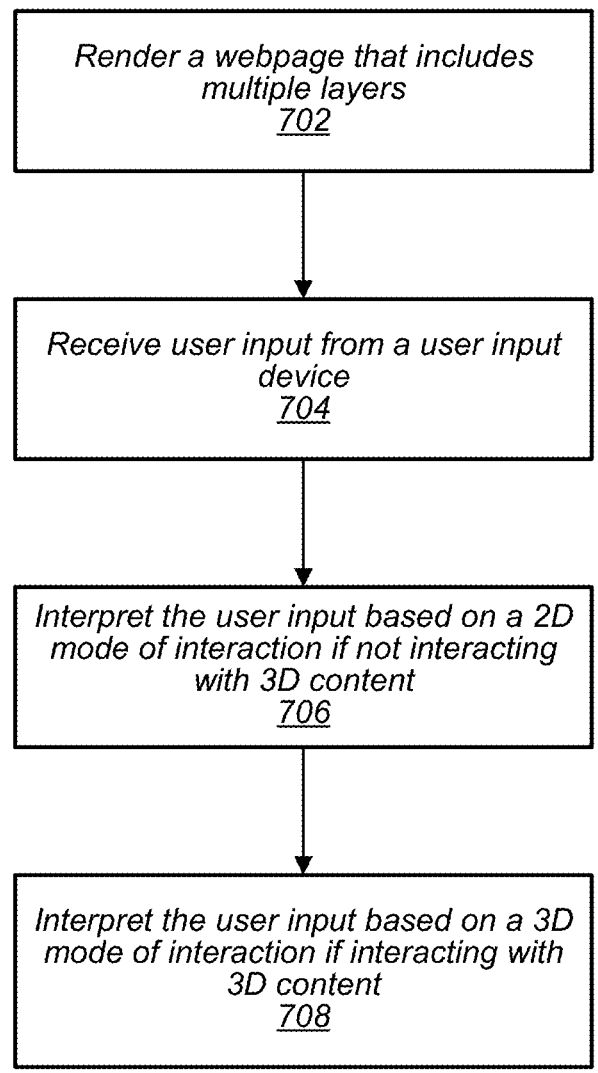
FIG. 7 illustrates a block diagram of an example of a method for rendering a webpage that includes both 2D and 3D content, according to some embodiments.

FIG. 7 illustrates a block diagram of an example of a method for rendering a webpage that includes both 2D and 3D content, according to some embodiments. The method shown in FIG. 7 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, a webpage that includes multiple layers may be rendered. In other words, a webpage including one or more layers may be rendered on a surface of a display device, such as one of the display devices described above. The layers may include a first layer associated with 3D content, e.g., a WebGL canvas, and a second layer associated with 2D content. In some embodiments, a single WebGL canvas may be configured to support multiple instances of 3D content. The single WebGL canvas may reduce overhead associated with maintaining multiple stereo enabled WebGL canvases and may also allow the 3D content managed by the single WebGL canvas to properly interact with and/or occlude one another. In some embodiments, the rendering may be a 3D stereoscopic rendering.

At 704, user input may be received from a user input device such as one of the input devices described above. For example, the user input device may be a stylus and the user input may include a button click on the stylus while the stylus is directed towards the surface of the display.

Figure 8A:
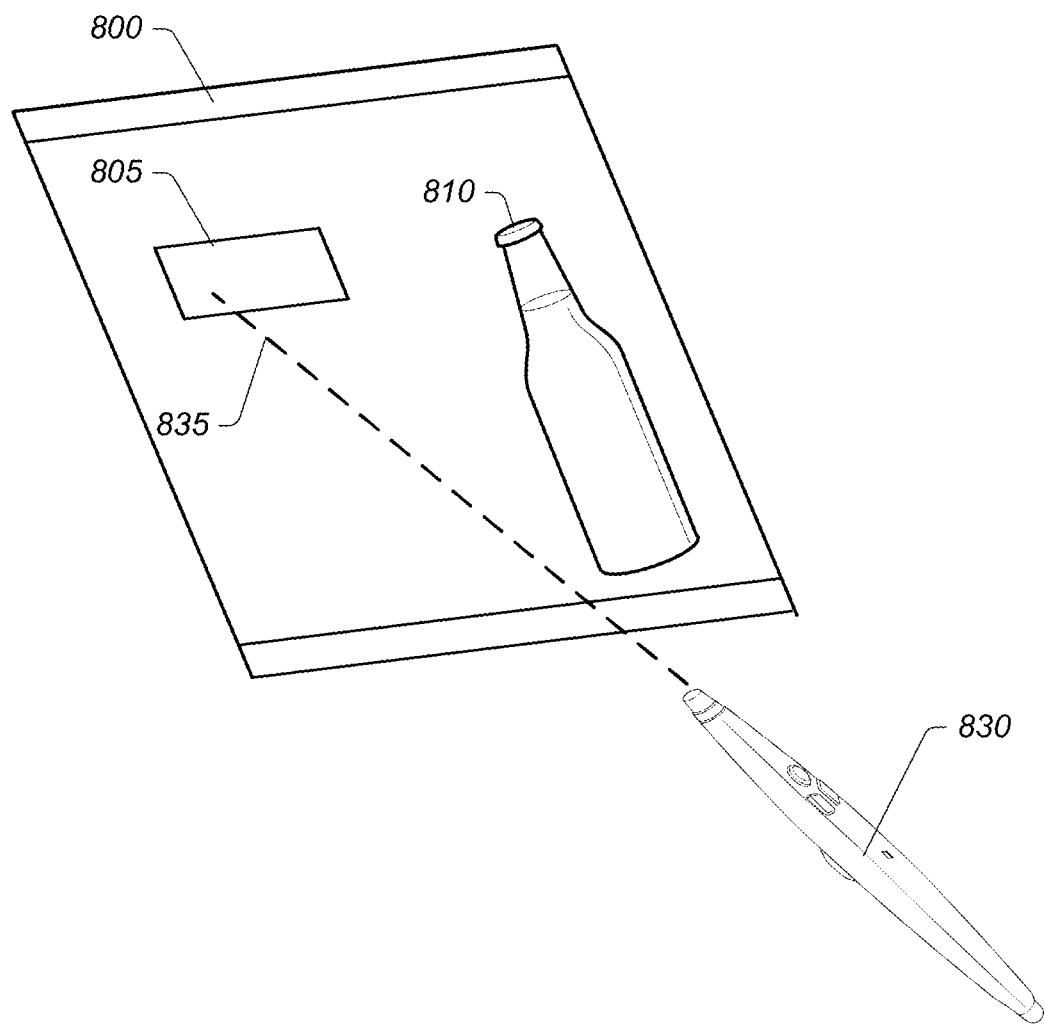
FIGS. 8A-B illustrate examples of user input device interaction with 2D and 3D content of a webpage, according to some embodiments.

At 706, the user input may be interpreted based on a 2D mode of interaction if the user input device is not interacting with the 3D content. In other words, in response to determining that the user input device is not substantially concurrently interacting with the 3D content, the user input may be assumed as an interaction with the 2D content, and thus interpreted based on a 2D mode of interaction. In some embodiments, the 2D mode of interaction may correspond to a first visual cursor, such as a mouse cursor. For example, as illustrated by FIG. 8A, a webpage 800 may include a first layer that includes 3D content 810 and a second layer that includes 2D content 805. A user input device 830, which may be similar to or the same as user input device 600 described above, may be directed to 2D content 805 based on the position and orientation of user input device 830. Further, a rendered virtual beam 835 may intersect the 2D content 805. Note that rendered virtual beam 835 may be included in first layer, e.g., in the WebGL canvas. Thus, it would be determined that the user input device is not interacting with 3D content 810.

Figure 8B:
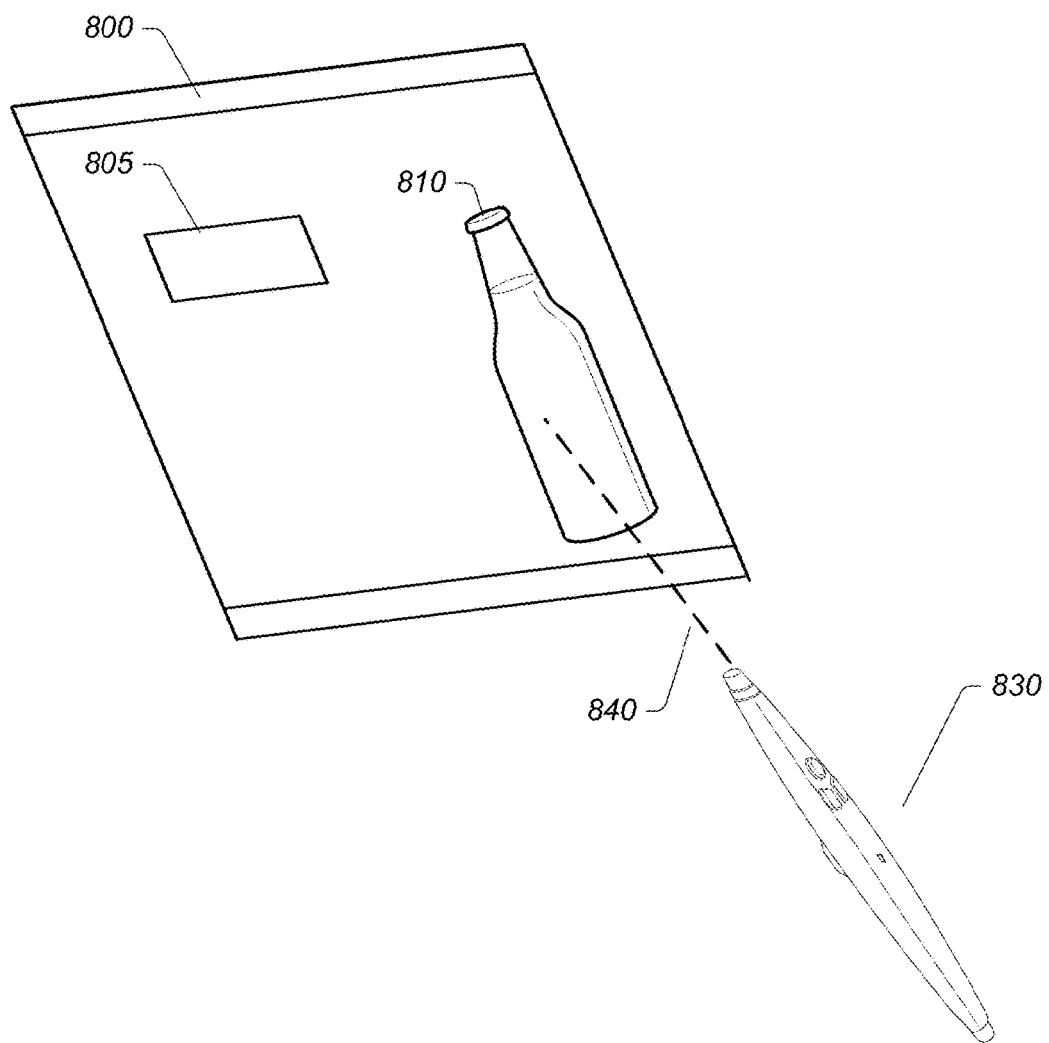

At 708, the user input may be interpreted based on a 3D mode of interaction if the user input device is interacting with the 3D content. In other words, in response to determining that the user input device is substantially concurrently interacting with the 3D content, the user input may be assumed as an interaction with the 3D content, and thus interpreted based on a 3D mode of interaction. In some embodiments, the 3D mode of interaction may correspond to a second visual cursor, such as a virtual beam rendered to appear as extending from a tip of a user input device, such as a stylus. Note that the rendered virtual beam may be included in first layer, e.g., in the WebGL canvas. For example, as illustrated by FIG. 8B, a webpage 800 may include a first layer that includes 3D content 810 and a second layer that includes 2D content 805. A user input device 830 may be directed to 3D content 810 based on the position and orientation of user input device 830. Further, a rendered virtual beam 840 may intersect the 3D content 810. Thus, it would be determined that the user input device is interacting with 3D content 810. Note that rendered virtual beam 840 may be included in first layer, e.g., in the WebGL canvas.

In some embodiments, a mapping and/or coordinate space transformation may be generated (or created) between absolute (x, y) layout position in pixels on a webpage and 3D positions in a unit of length (e.g., meters, centimeters, inches, and so forth) associated with a WebGL canvas' virtual world (3D scene). The mapping and/or coordinate space transformation may allow accurate positioning of 3D content relative to 2D content on the webpage. In other words, the mapping and/or coordinate space transformation may enable positioning of 3D content relative to 2D content on the webpage within a specified tolerance, e.g., on the order of plus or minus 1 to 2 pixels or less.

In some embodiments, the mapping and/or coordinate space transformation may account for a scroll offset of a webpage via movement of a virtual camera to achieve scrolling behavior for the 3D content, where the movement of the virtual content corresponds to the scroll offset based on the mapping and/or coordinate space transformation. In other words, a scroll offset of a specified number of pixels may result in a corresponding movement of the virtual camera in meters. For example, a user may "grab" and move 3D content substantially simultaneously with page scrolling without display of the 3D content being affected and/or inadvertently repositioned/moved during the page scroll. In other words, a user may pick up and hold onto an object, e.g., via a user input device such as a stylus as described above, within the 3D content and the object will remain "stuck" to the stylus regardless of whether or not the page is scrolling.

In some embodiments, objects/models/root transforms in the 3D scene can be moved/translated as the webpage scrolls. In other words, the 3D content may be moved/translated an amount corresponding to the scrolling of the webpage. In some embodiments, objects/models/root transforms in the 3D scene may be fixed in a region of the webpage (e.g., a shopping cart and/or a backpage) and not scroll with the webpage.

Figure 9:
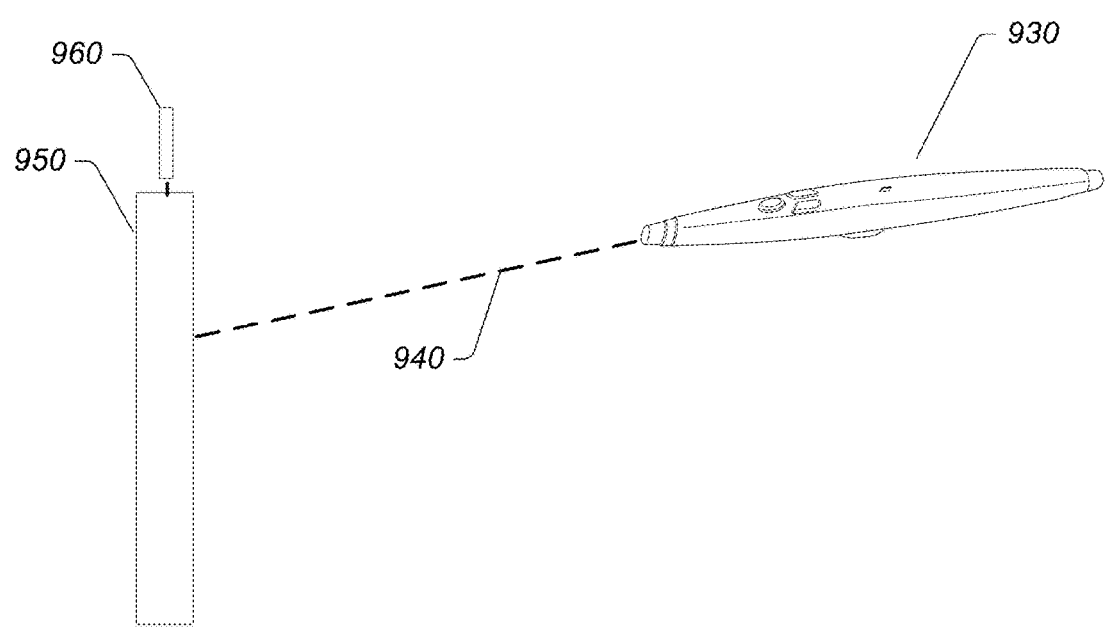
FIG. 9 illustrates an example of tracking an intersection of a virtual beam with a surface of a display device, according to some embodiments.

In some embodiments, a position of a user input device, such as a stylus, at a point of intersection with a display surface may be captured/tracked. The captured/tracked position may be used to determine whether the user input device is currently intersecting 2D content on the webpage. For example, as illustrated by FIG. 9, a position and orientation (e.g., a 6-DOF position and orientation) of a user input device 930 may be tracked relative to display 950, which may be similar to or the same as the displays described above, via tracking sensors, such as cameras 960 which may be similar to or the same as the tracking sensors/systems described above. A virtual beam 940 may be rendered (e.g., as part of the first layer) as extending from a tip of user input device 930, which may be similar to or the same as user input device 600 described above, and intersecting display 950. The surface of display 950 may be considered a zero-parallax plane and a render plane for 2D content. Thus, the physical coordinates of the intersection may be mapped (e.g., via the mapping and/or coordinate space transformation described above) to pixel coordinate values to determine whether the virtual beam intersects 2D content positioned at the mapped pixel coordinate values. In some embodiments, user input interaction may be automatically transitioned between a 2D mode of interaction and a 3D mode of interaction based, at least in part, on whether the user input device is directed to (e.g., positioned to point at) 2D or 3D content of the webpage. In some embodiments, the 2D mode may be associated with a first visual cursor and the 3D mode may be associated with a second visual cursor. For example, the first visual cursor may be a mouse cursor (e.g., such as an arrow) and the second visual cursor may be a virtual beam extending from a tip of the user input device. In some embodiments, if mouse emulation is not supported by the WebGL canvas, a 2D element that the user input device is intersecting, e.g., based on captured/tracked position, may be forwarded (sent) mouse input events, e.g., via JavaScript. In addition, corresponding visual states of the cursor (e.g., default, on hover, pressed, release, and so forth) may be updated via changing custom cascading style sheets (css) classes.

In some embodiments, user input device collisions with 3D content (e.g., via a virtual beam extending from the user input device) may be prioritized over user input device collisions with 2D content (e.g., based on captured/tracked position). In some embodiments, such prioritization may allow a user to continue to interact with 3D content in the case that 3D content is moved substantially directly behind 2D content and/or beyond a zero-parallax plane. Note that if the user input device is not intersecting with any 3D content, a virtual beam may only extend to an intersection with the zero-parallax plane which may prevent the virtual beam from extending past 2D content on the webpage (which is at zero-parallax).

In some embodiments, the user input device may activate scrolling of the webpage in any direction based on a secondary button input when dragging anywhere on the webpage. In some embodiments, the user input device may activate scrolling of the webpage via a primary button input.

Transitioning Between 2D and 3D Content

Figure 10A:
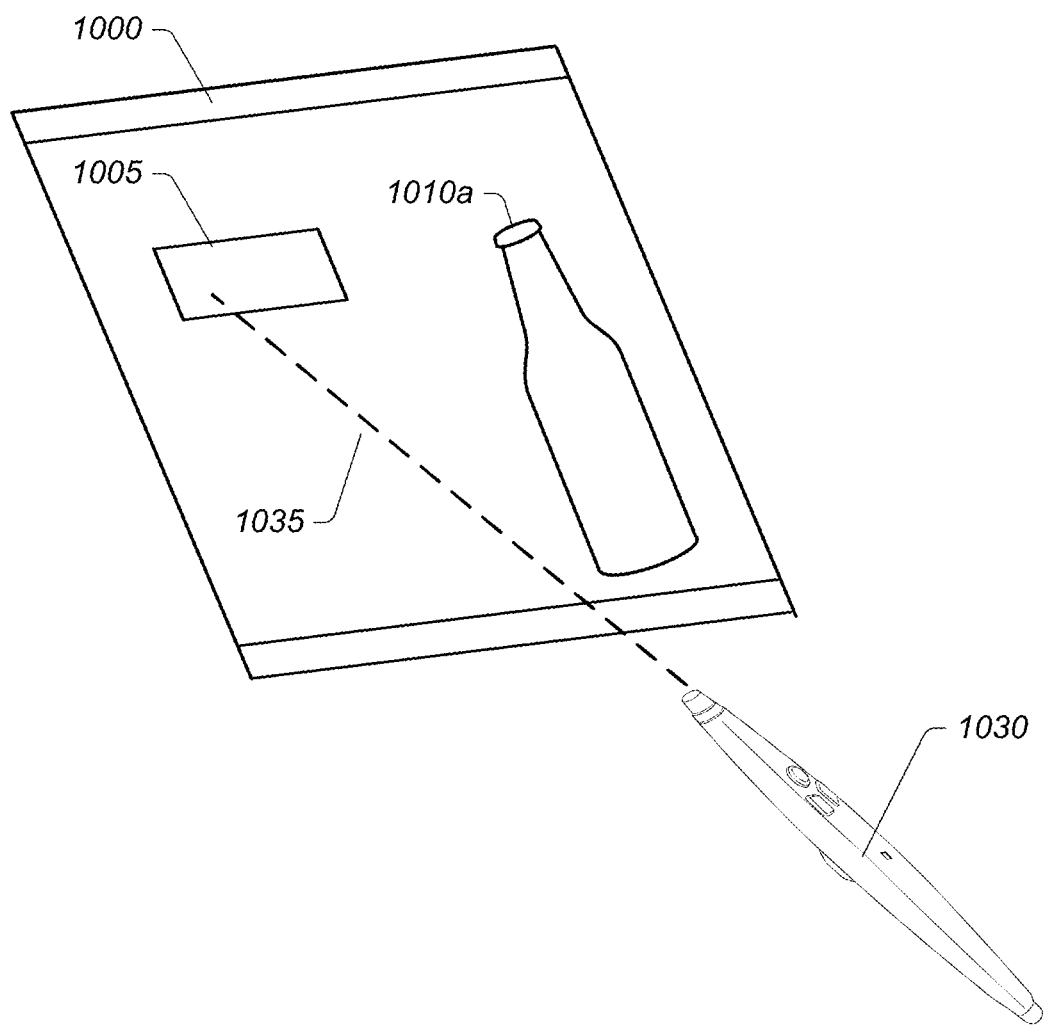
FIGS. 10A-C illustrate examples of transitioning between viewing states of the 3D content, according to some embodiments.
Figure 10B:
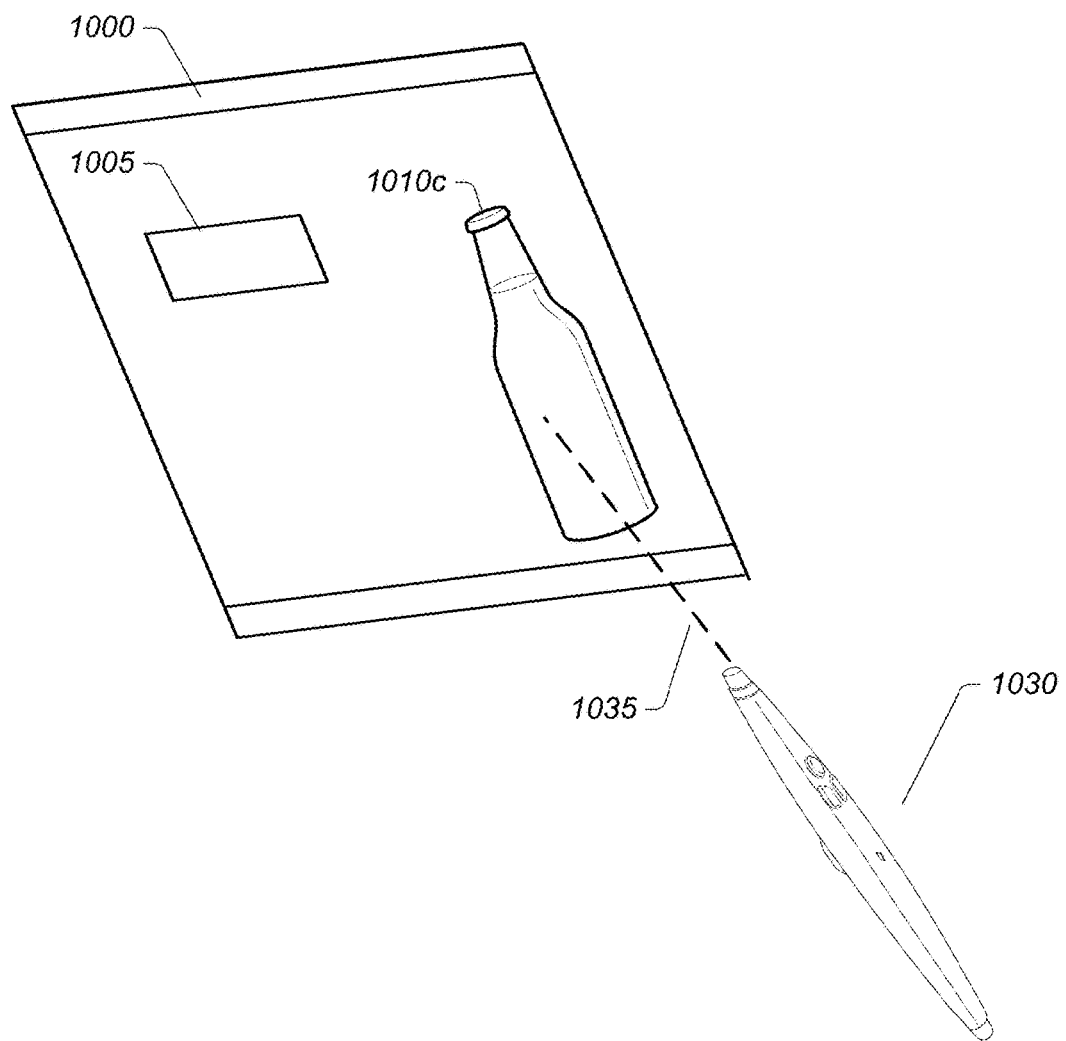
Figure 10C:
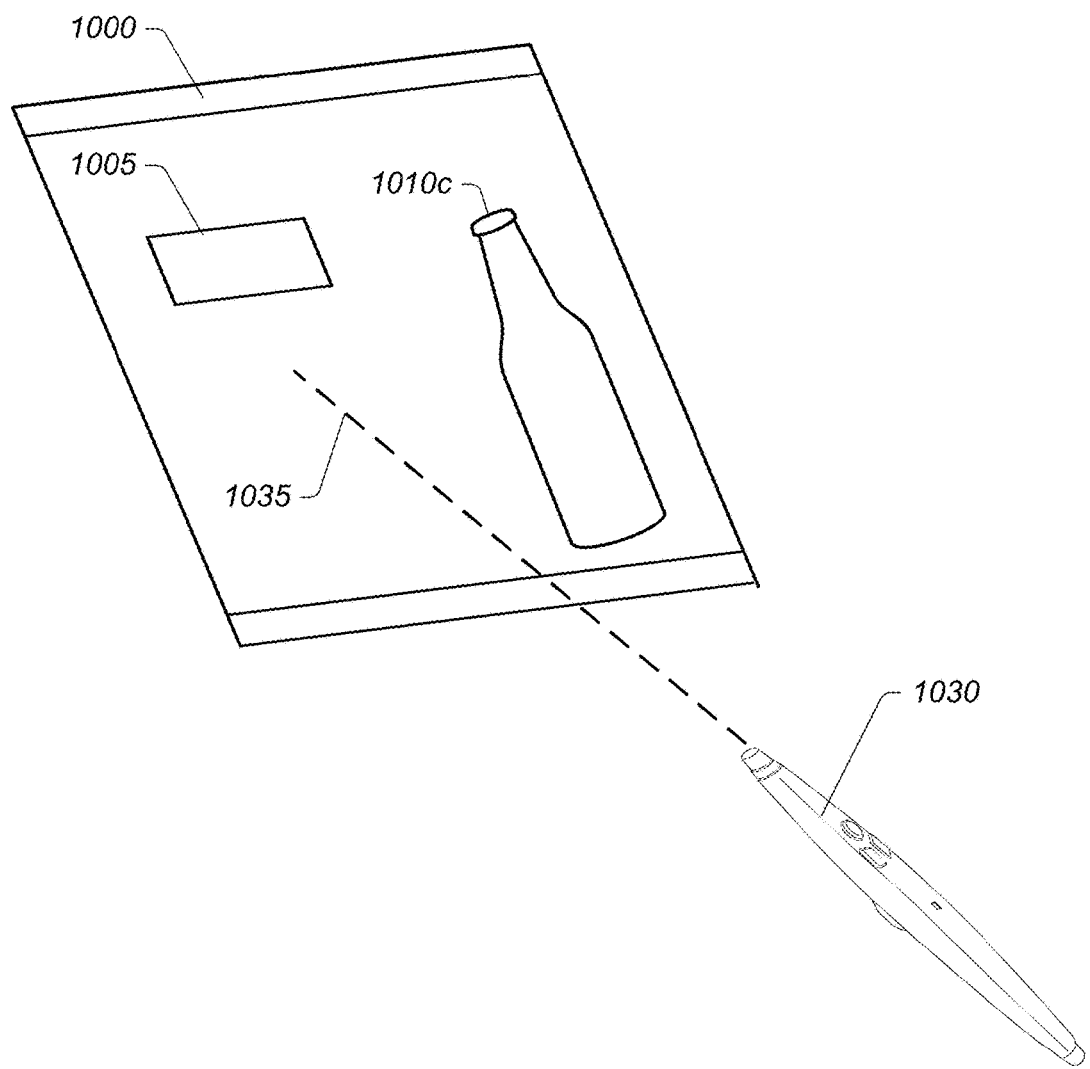

In some embodiments, one or more features of the 2D and/or 3D content may be adjusted (or changed) when transitioning to and from viewing 3D content and 2D content. For example, FIGS. 10A-C illustrate examples of transitioning between viewing states of the 3D content, according to some embodiments. In particular, FIG. 10A illustrates an idle state (e.g., a quasi 2D state), FIG. 10B illustrates an on hover state (e.g., a 3D viewing state), and FIG. 10C illustrates a return to the idle state. Note that a transition time may be specified to create an animation affect when changing states.

In some embodiments, rendering of the 3D content may be adjusted or altered based on one or more states associated with the 3D content. For example, as illustrated by FIG. 10A, a webpage 1000 may include both 2D content 1005 and 3D content 1010a. As shown, when virtual beam 1035 of user input device 1030 is not intersecting 3D content 1010a, 3D content 1010a may be rendered in an idle state. Thus, 3D content 1010a may be rendered (or presented) in a "flattened" state in which a z-scale component of 3D content 1010a is adjusted to a relatively small value. Such a rendering may alter 3D content (or 3D model) 1010a such that 3D content 1010a appears as a 2D image. In other words, 3D content may be adjusted to appear like 2D images that are a part of the webpage.

As another example, as illustrated by FIG. 10B, 3D content 1010b may be transitioned from the idle state shown in FIG. 10A to an interactive or "on hover" state when virtual beam 1035 of user input device 1030 intersects 3D content 1010b. Thus, rendering of 3D content 1010b may transition from the idle state (e.g., "flattened" as shown in FIG. 10A) to an "unflattened" state in which the z-scale component is increased from the relatively small value to a specified value. In some embodiments, the transition may appear as an animation of the 3D content as the z-scale component is increase over a period of time (e.g., a transition time). In other words, animation of the z-scale component (e.g., increasing the value of the z-scale component over a period of time) may create an illusion that 3D content is "coming to life" on user input device hover.

As a further example, as illustrated by FIG. 10C, when 3D content 1010c has been interacted with (e.g., as illustrated by FIG. 10B) and then returned to an original position (e.g., dropped within a region where originally docked), 3D content 1010c may transition back to the idle state, e.g., the z-scale component may be decreased back to the relatively small value. In some embodiments, the transition may appear as an animation of the 3D content as the z-scale component is decreased over a period of time. In other words, animation of the z-scale component (e.g., decreasing the value of the z-scale component over a period of time) may create an illusion that the 3D content is returning to a 2D image.

Figure 11A:
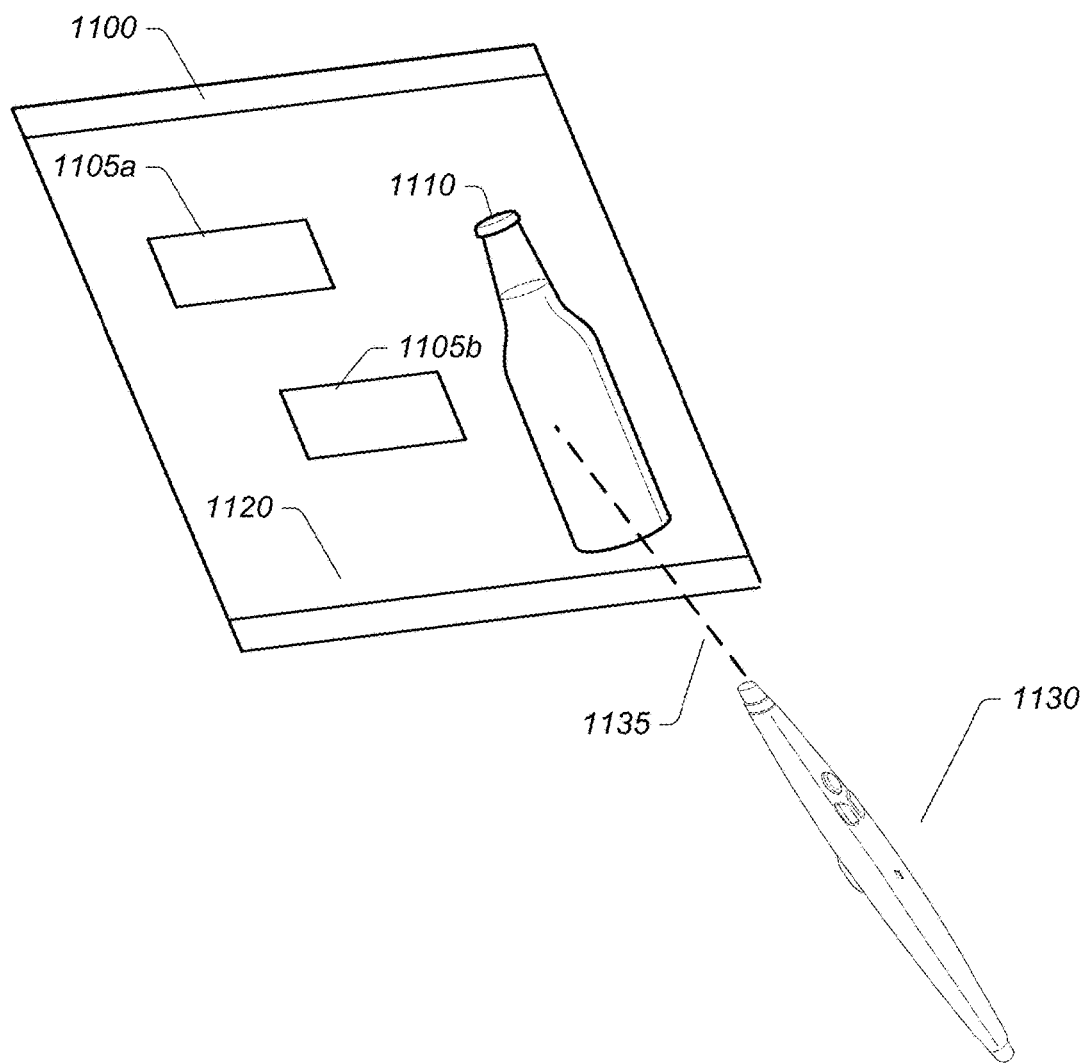
FIGS. 11A-C illustrate examples of adjusting opacity of a background of the 3D content, according to some embodiments.
Figure 11B:
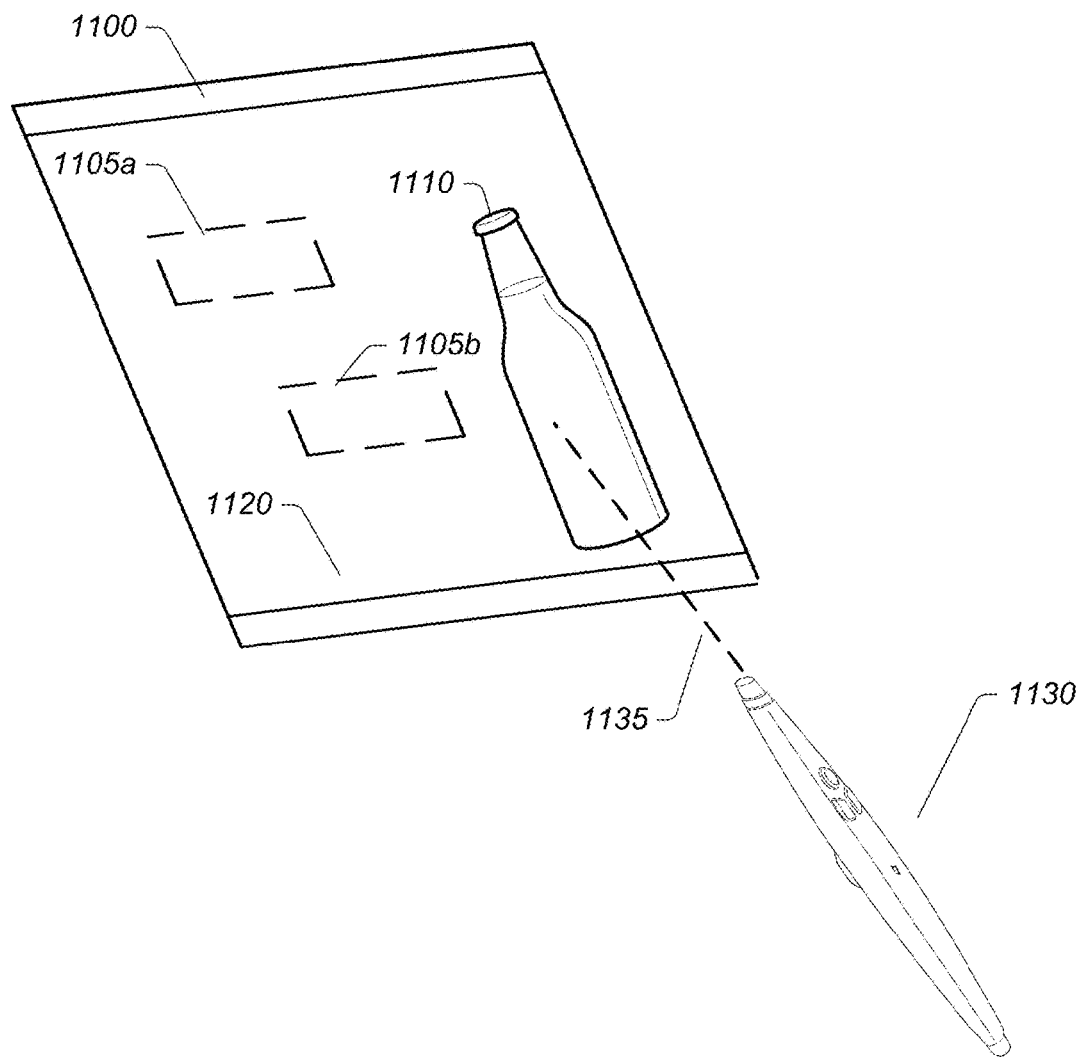
Figure 11C:
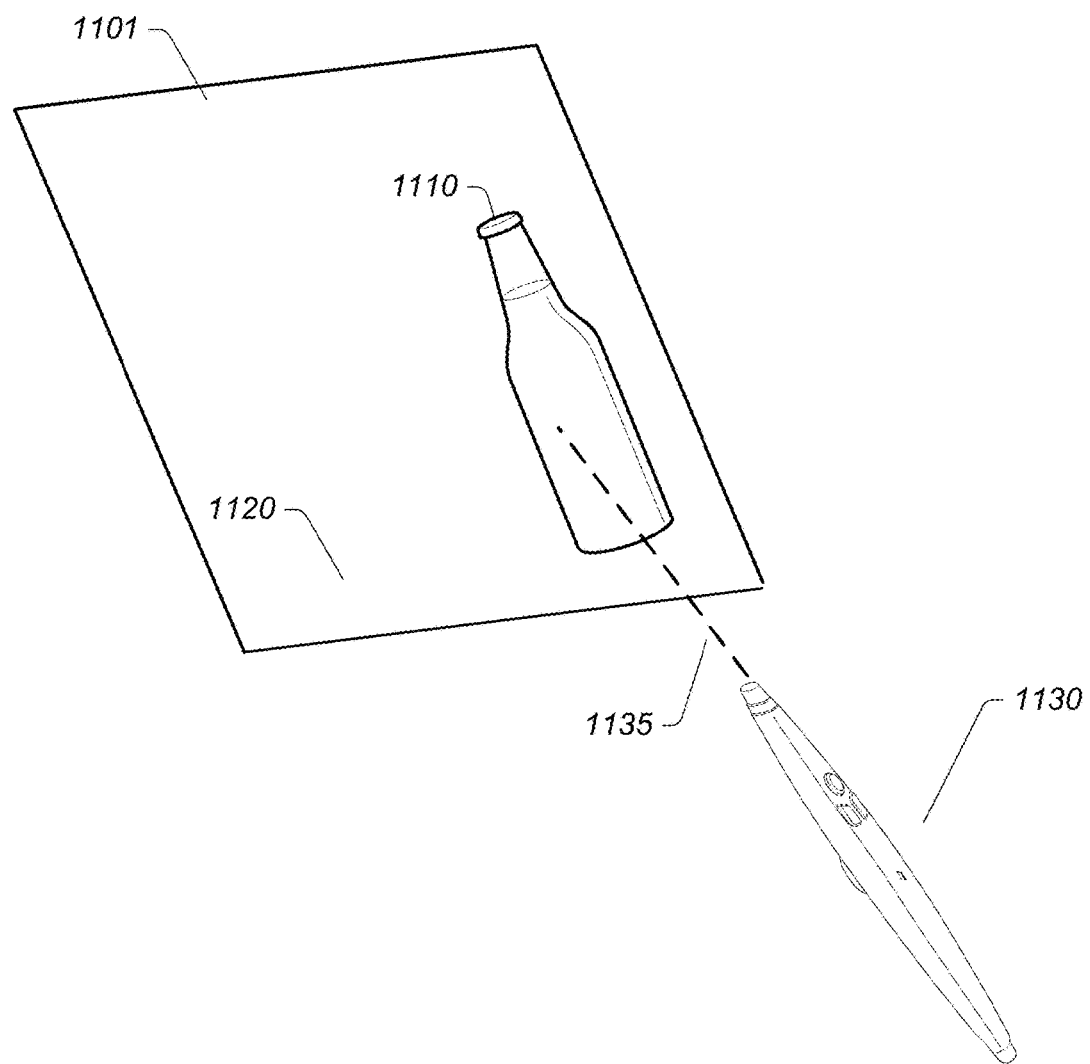

In some embodiments, rendering of the 3D content may be adjusted or altered based on one or more viewing modes associated with the 3D content. For example, as illustrated by FIGS. 11A-C, in a full screen and/or model viewing mode, an opaque background rendered in the WebGL canvas may be used to create an effect of the 2D content on the webpage smoothly fading out while allowing the WebGL canvas to fully take over and solely present 3D content. In other words, an opaque background may be transitioned to over time (e.g., the transition time) via increase of an opacity associated with a background layer of the WebGL canvas over a specified time period. In some embodiments, a pallet of user input device (e.g., stylus) based tools may be enabled. The pallet may enable a more comprehensive set of user interactions as compared to a non-full screen and/or non-model viewing mode. The set of user interactions may include, for example, a cutting plane (e.g., Studio cutting plane) tool, a dissection tool, and so forth.

As shown in FIG. 11A, a webpage 1100 may include one or more 2D content objects 1105a-b as well as 3D content 1110. In addition, webpage 1100 may include background 1120. As shown, as the viewing mode transitions to a full screen and/or model viewing mode (e.g., as virtual beam 1135 of user input device 1130 intersects 3D content 1110), the opacity of background 1120 may be adjusted to create the effect of 2D content 1105a-b fading out. Thus, FIG. 11A shows background 1120 as fully transparent, FIG. 11B illustrates background 1120 as semi-transparent (e.g., 2D content 1105a-b only partially visible as shown by dashed lines), and FIG. 11C illustrates background 1120 as fully opaque (e.g., 2D content 1105a-b not visible) as well as viewport 1101. In addition, when transitioning out of the full screen and/or model viewing mode, the opacity associated with the background layer of the WebGL canvas may be decrease over a specified period of time to create an effect of the 2D content re-appearing.

Figure 12:
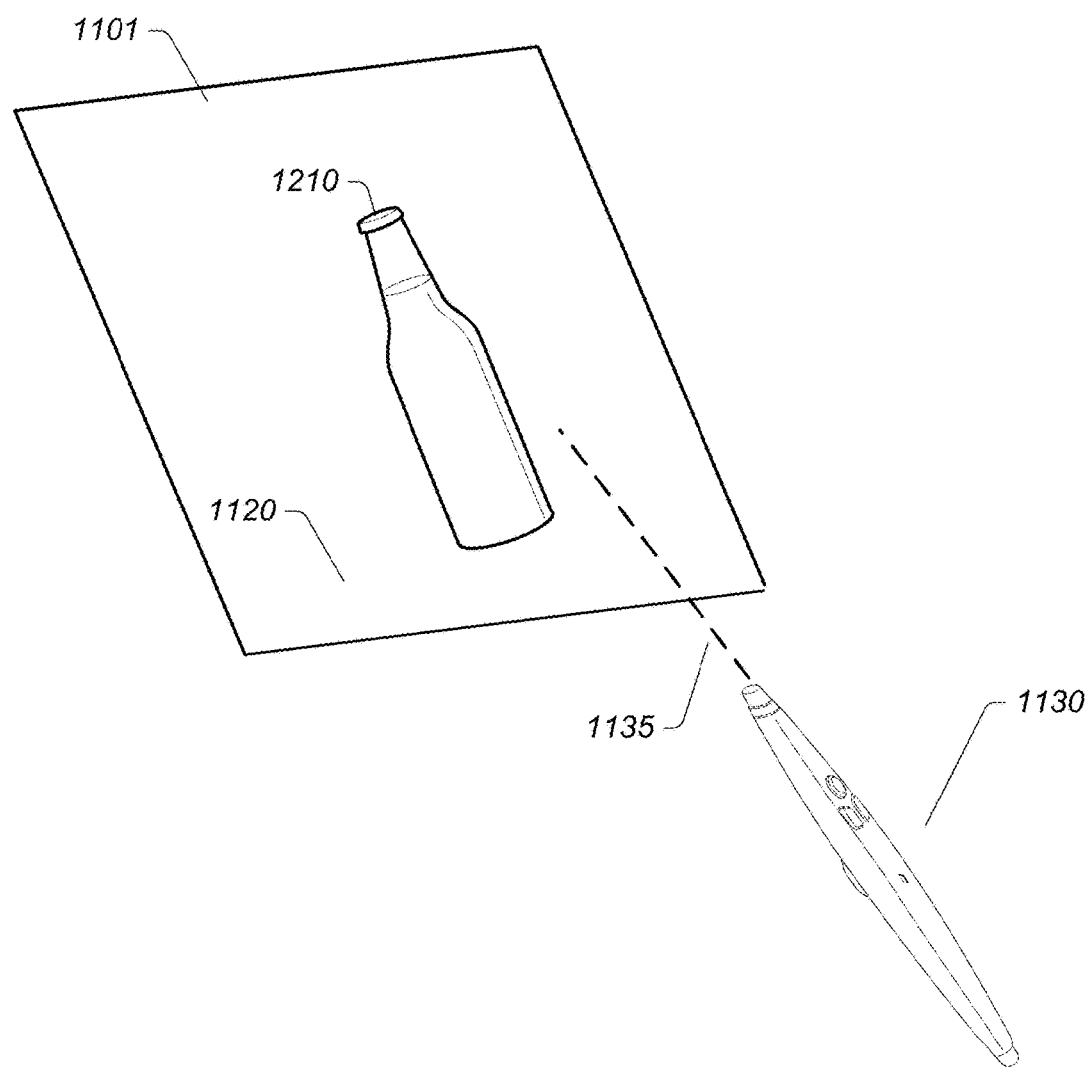
FIG. 12 illustrates an example of moving the 3D content upon focus, according to some embodiments.

As another example, as illustrated by FIG. 12, a focus object may animate to a center of a viewport of a browser when entering full screen and/or model viewing mode. In other words, the position of the focus object may be changed over a period of time to move the focus object from an initial position in the viewport to the center of the viewpoint. Thus, referring back to FIG. 11A, when entering the full screen and/or model viewing mode, 3D content 1110 is moved to the center of viewport 1101 as shown by 3D content 1210 in FIG. 12. In addition, the focus object may animate back to the original position upon exiting the full screen and/or model viewing mode. In other words, the position of the focus object may be changed over a period of time to move the focus object from the center of the viewport to the initial position.

Figure 13:
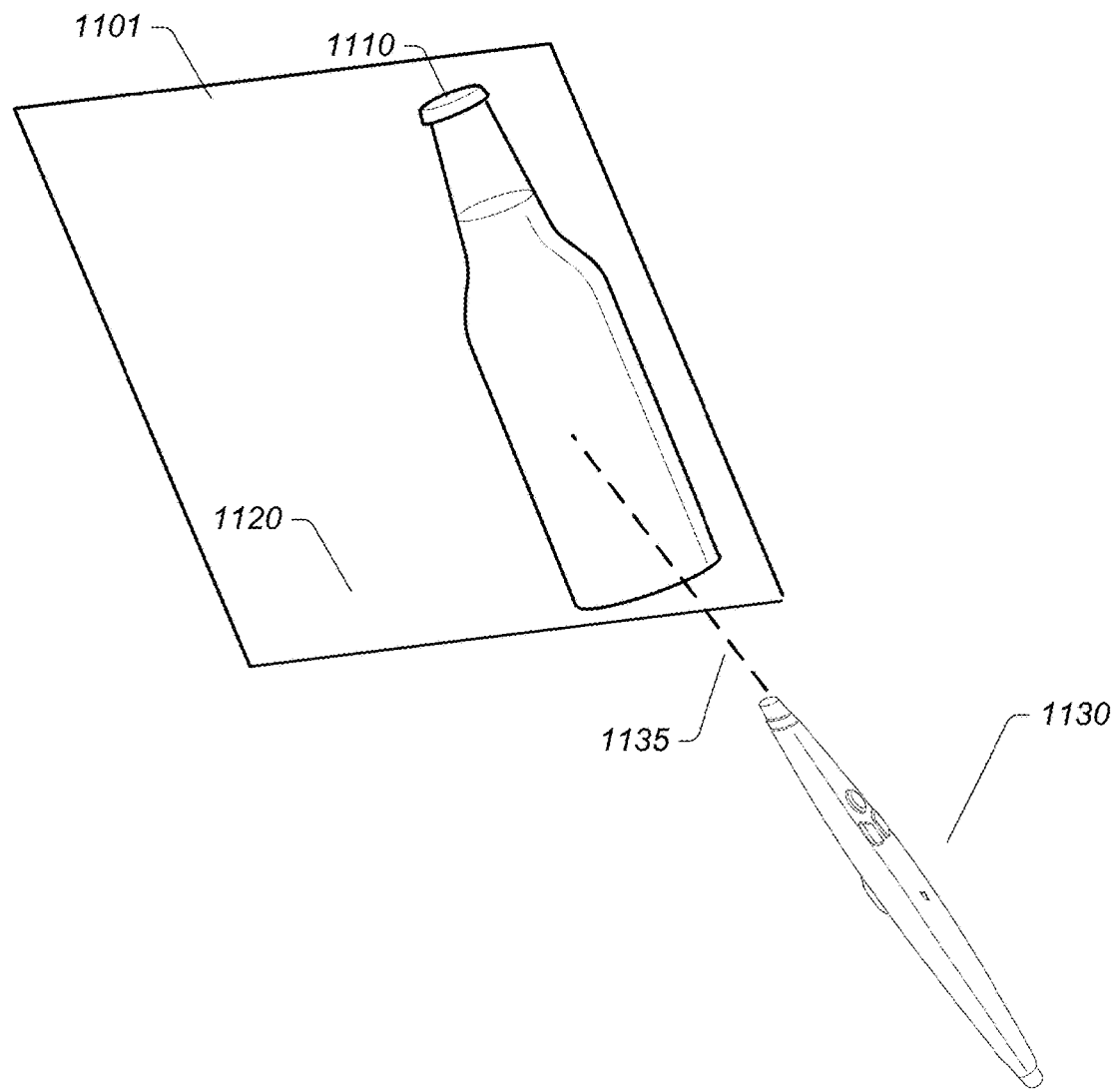
FIG. 13 illustrates an example of scaling the 3D content upon focus, according to some embodiments.

As yet another example, as illustrated by FIG. 13, a focus object may be scaled to fit within a percentage of a viewport's extents when entering full screen and/or model viewing mode. In other words, the size of the focus object may be changed over a period of time to scale the object from an initial size to a larger size to fit within a specified percentage (e.g., 25%, 50%, 75%, 100% and/or other values) of the viewport's extents. Thus, referring back to FIG. 11A, when entering the full screen and/or model viewing mode, 3D content 1110 is scaled to fit within a specified percentage of the extents of viewport 1101 as shown by 3D content 1310 in FIG. 13. In addition, upon exiting the full screen and/or model viewing mode, the focus object may be scaled back to the initial size. In other words, the size of the focus object may be changed over a period of time to scale the object from the larger size back to the initial size.

As a further example, one or more attributes of 3D content other than the focus object (non-focus 3D content objects) may be adjusted to fade away, scatter, and/or shrink upon entering a full screen and/or model viewing mode. In other words, a non-focus 3D content object may change any combination of position, opacity, and/or size over a period of time when entering the full screen and/or model viewing mode.

Figure 14A:
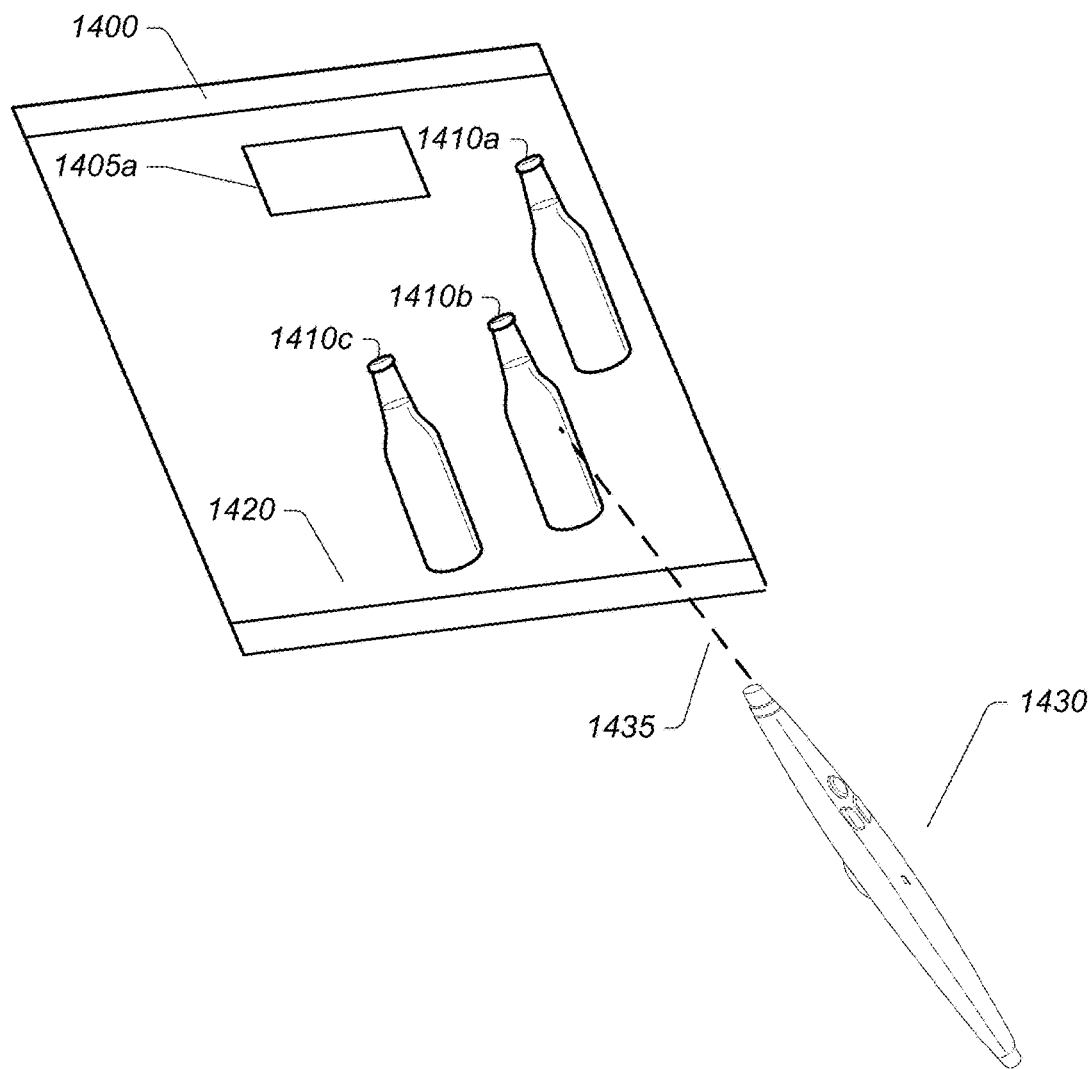
FIGS. 14A-C illustrate an example of decreasing an opacity associated with one or more non-focus 3D content objects over a period of time when entering a full screen and/or model, according to some embodiments.
Figure 14B:
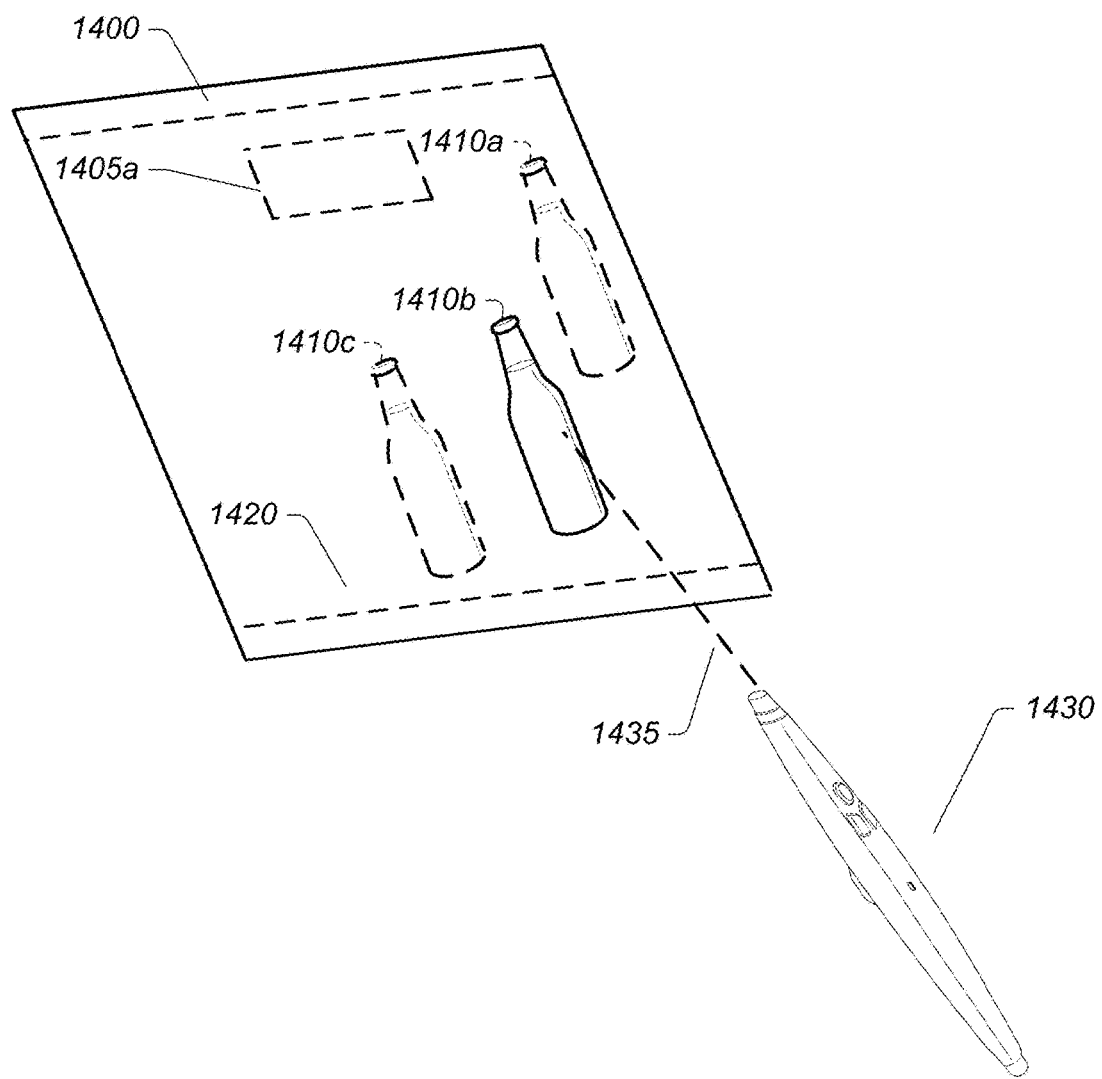
Figure 14C:
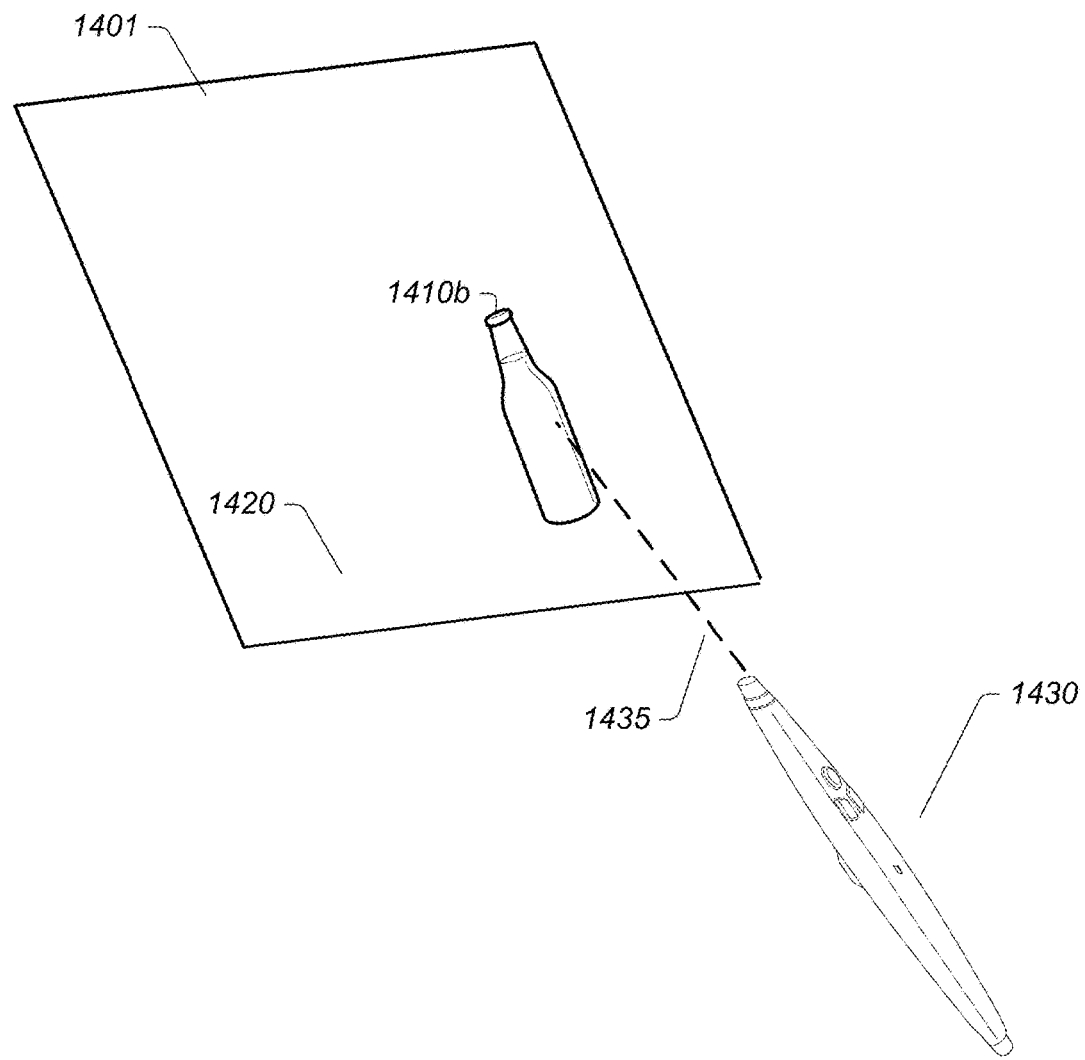

For example, in some embodiments, as illustrated by FIGS. 14A-C, an opacity associated with one or more non-focus 3D content objects may be decreased over the period of time when entering the full screen and/or model viewing mode to create a fade away animation. Thus, as shown in FIG. 14A, a webpage 1400 may include 2D content 1405a, background 1420, and one or more instances of 3D content 1410a-c. Note that 3D content 1410a-c may all be rendered via a single WebGL canvas as discussed above. In addition, a user input device 1430 may interact with 3D content 1410b via virtual beam 1435. Turning to FIG. 14B, upon detection of the interaction with 3D content 1410b, the opacity of background 1420 may be increased (as indicated by dashed lines around 2D content 1405a) and/or opacity of 3D content 1410a and 1410c may be decreased. FIG. 14C illustrates viewport 1401 in which 3D content 1410a and 1410c are no longer visible (e.g., the 3D content is transparent). In addition, background 1420's opacity has been increase to obscure 2D content 1405a.

Figure 15A:
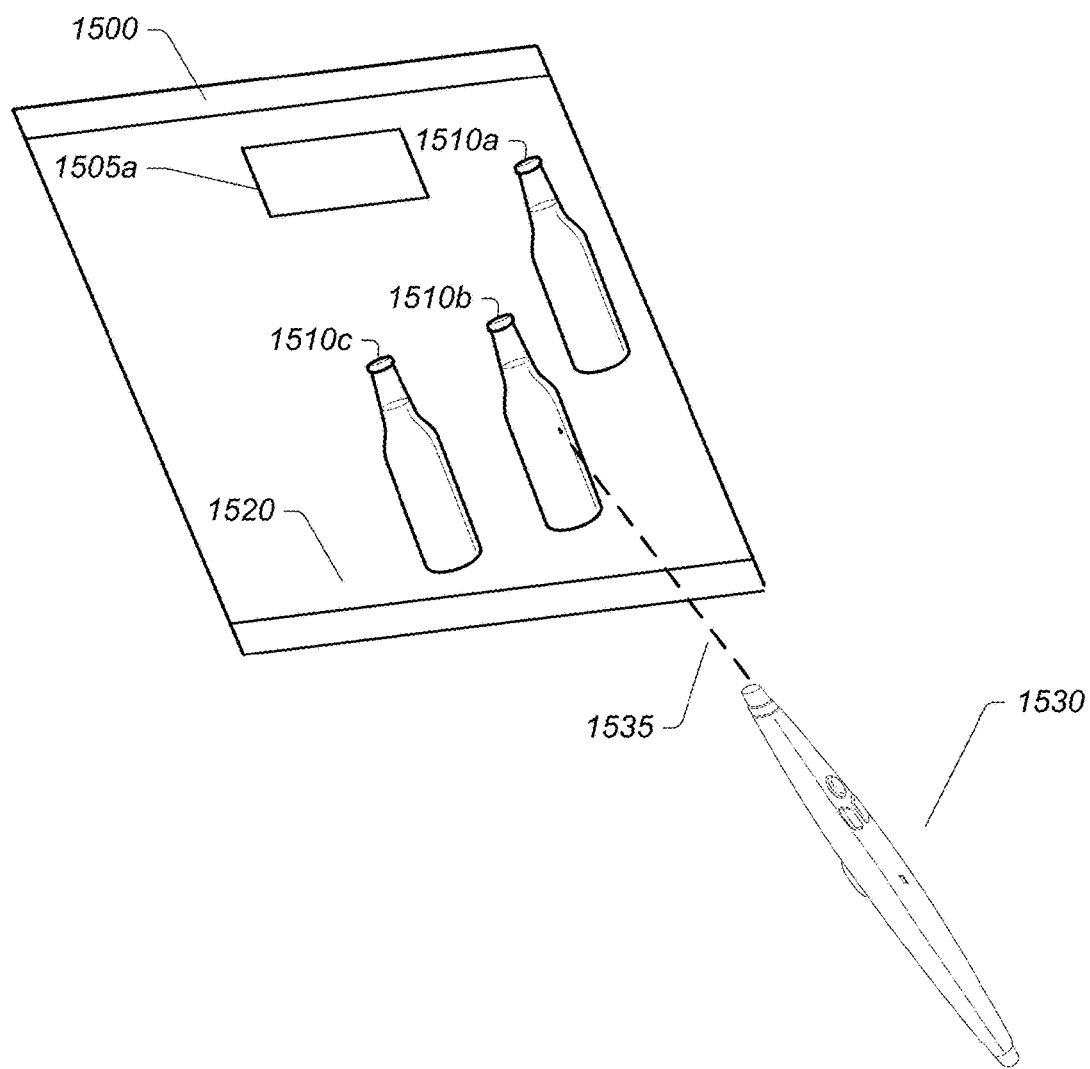
FIGS. 15A-B illustrate an example of changing a position associated with one or more non-focus 3D content objects over a period of time when entering a full screen and/or model viewing mode, according to some embodiments.
Figure 15B:
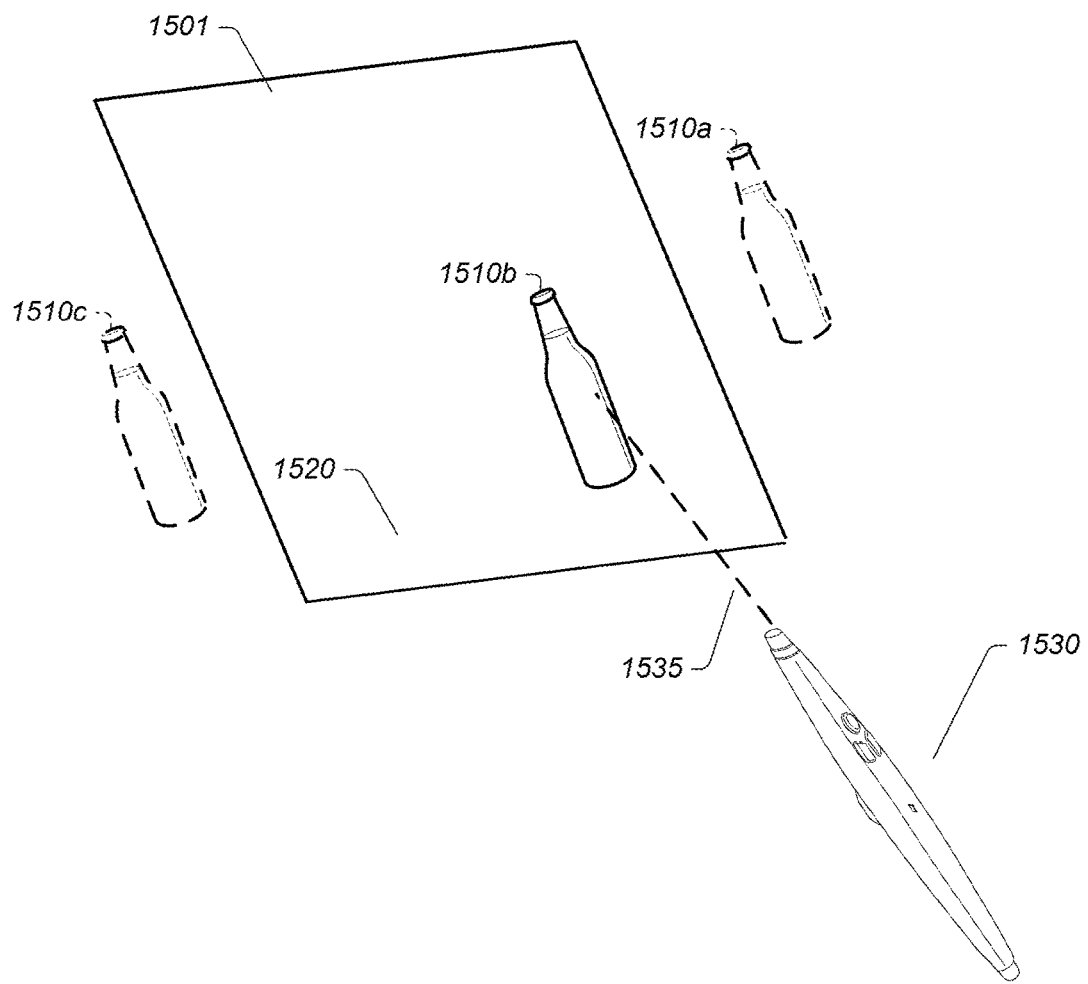

Alternatively, or in addition, as illustrated by FIGS. 15A-B, a position associated with one or more non-focus 3D content objects may be changed over the period of time when entering the full screen and/or model viewing mode to create a scatter animation. For example, if a non-focus 3D content object has an initial position near a center of a viewpoint, the position may be changed over a period of time to move the non-focus 3D content object from the center of the viewport to a position at an edge of and/or outside of the viewport. As shown in FIG. 15A, a webpage 1500 may include 2D content 1505a, background 1520, and one or more instances of 3D content 1510a-c. In addition, a user input device 1530 may interact with 3D content 1510b via virtual beam 1535. Turning to FIG. 15B, positions of 3D content 1510a and 1510c may be changed such that 3D content 1510a and 1510c are no longer in the visible area of viewport 1501. In addition, the opacity of background 1520 may be increased to obscure 2D content 1505a.

Figure 16A:
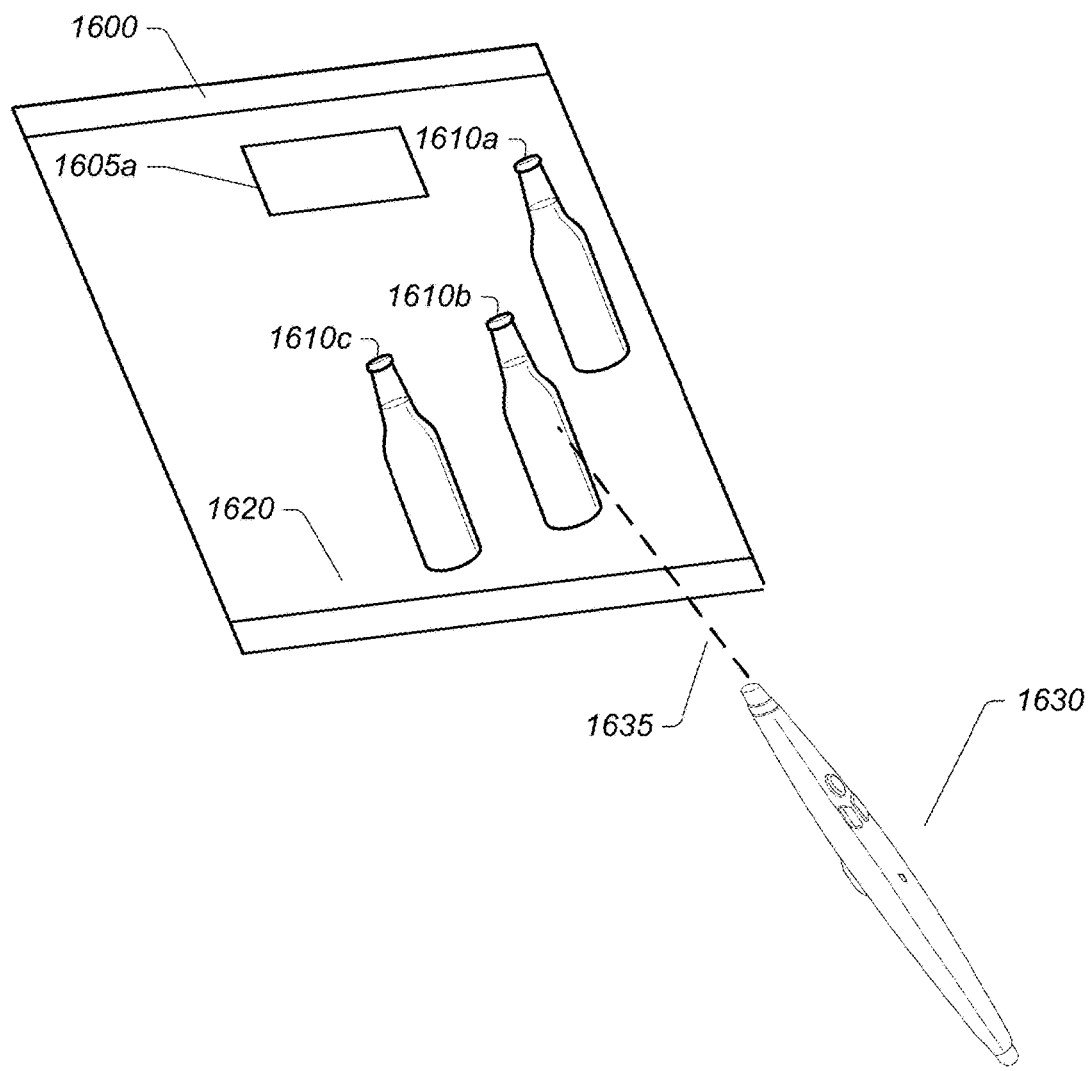
FIGS. 16A-B illustrate an example of changing a scale associated with one or more non-focus 3D content objects, according to some embodiments.
Figure 16B:
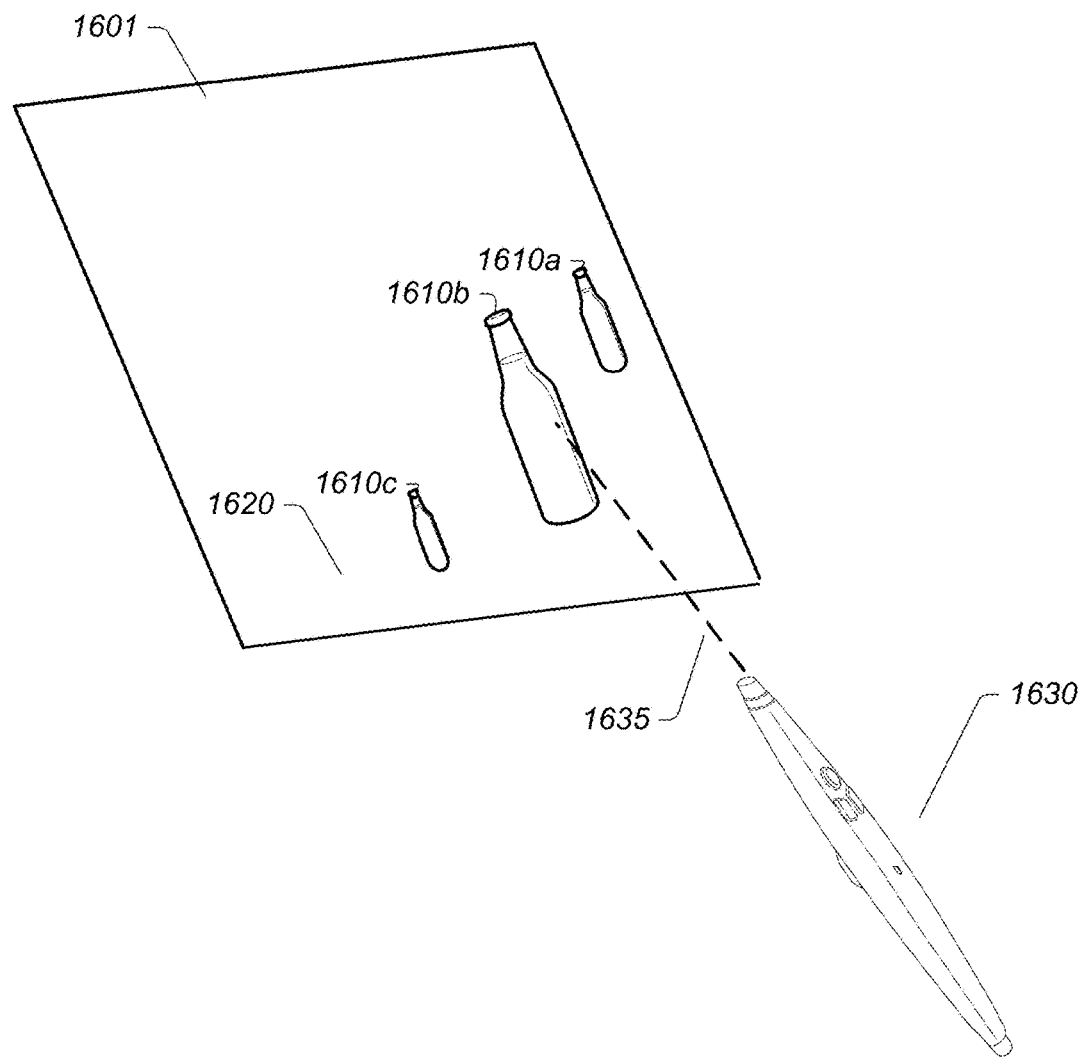

Alternatively, or in addition, as illustrated by FIGS. 16A-B, a scale associated with one or more non-focus 3D content objects may be changed over the period of time when entering the full screen and/or model viewing mode to create a shrink animation. For example, a size associated with one or more non-focus 3D content objects may be decreased over the period of time when entering the full screen and/or model viewing mode to create a shrink animation. As shown in FIG. 16A, a webpage 1600 may include 2D content 1605a, background 1620, and one or more instances of 3D content 1610a-c. In addition, a user input device 1630 may interact with 3D content 1610b via virtual beam 1635. Turning to FIG. 16B, sizes of 3D content 1610a and 1610c may be adjusted such that 3D content 1610a and 1610c appear to shrink in comparison to 3D content 1610b in viewport 1601. In addition, the opacity of background 1620 may be increased to obscure 2D content 1605a.

Figure 17:
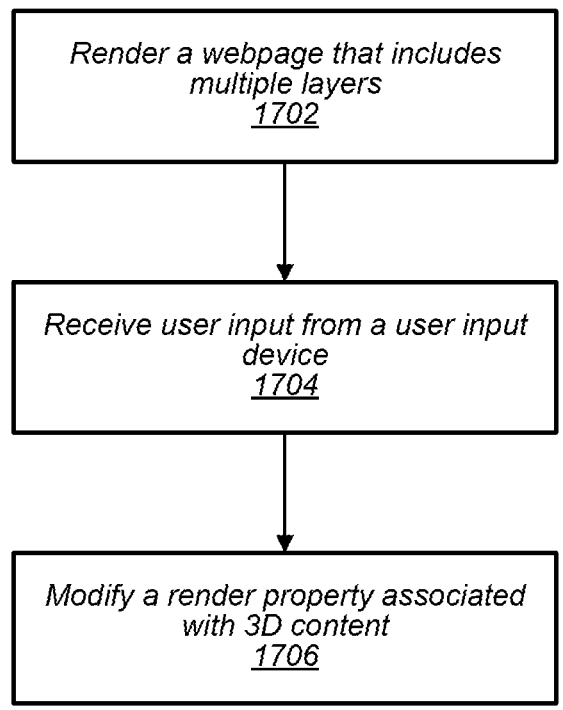
FIG. 17 illustrates a block diagram of an example of a method for modifying one or more properties of 3D content rendered on a that includes both 2D and 3D content, according to some embodiments.

FIG. 17 illustrates a block diagram of an example of a method for modifying one or more properties of 3D content rendered on a that includes both 2D and 3D content, according to some embodiments. The method shown in FIG. 17 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1702, a webpage that includes multiple layers may be rendered. In other words, a webpage including one or more layers may be rendered on a surface of a display device, such as one of the display devices described above. The layers may include a first layer associated with 3D content, e.g., a WebGL canvas, and a second layer associated with 2D content. In some embodiments, a single WebGL canvas may be configured to support multiple instances of 3D content. The single WebGL canvas may reduce overhead associated with maintaining multiple stereo enabled WebGL canvases and may also allow the 3D content managed by the single WebGL canvas to properly interact with and/or occlude one another. In some embodiments, the rendering may be a 3D stereoscopic rendering.

At 1704, user input may be received from a user input device such as one of the input devices described above. For example, the user input device may be a stylus and the user input may include a button click on the stylus while the stylus is directed towards the surface of the display.

At 1706, a render property associated with the 3D content may be modified, e.g., in response to determining that the user input device is substantially concurrently interacting with the 3D content. The render property may be one of a plurality of render properties associated with of the 3D content. For example and as described above, the plurality of render properties may include opacity of a background of the 3D content, position of the 3D content, size of the 3D content, and/or opacity of the 3D content. For example and as described above, an opacity associated with a background of the 3D content may be adjusted so as to obscure visibility of the 2D content. As another example and as described above, a position of the 3D content may be adjusted such that the 3D content is centered in a viewport displaying the 3D content. As a further example, a size associated with the 3D content may be adjusted such that the 3D content fills a specified percentage of a viewport displaying the 3D content.

In some embodiments, modification may include incrementally modifying the render property over a specified period of time (e.g., a transition time), thereby animating modification of the render property.

In some embodiments, in response to determining that the user input device is not substantially concurrently interacting with the 3D content, a z-scale value associated with the 3D content may be decreased such that a rendering of the 3D content appears as 2D content (e.g., as described above). In some embodiments, the z-scale value may be incrementally decreased over a specified period of time (e.g., a transition time), thereby animating a transition from 3D appearance to 2D appearance of the 3D content. In addition, in some embodiments, in response to determining that a subsequent user input is substantially concurrently interacting with the 3D content that appears as 2D content, the z-scale value may be increased such that the rendering of the 3D content appears as 3D content. In some embodiments, the z-scale value may be incrementally increased value over a specified period of time (e.g., a transition time), thereby animating a transition from 2D appearance to 3D appearance of the 3D content.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium storing programming instructions executable by a processor to:
    render, on a surface of a display device, a webpage comprising at least two layers, wherein a first layer of the at least two layers is associated with multiple instances of three-dimensional (3D) content rendered on the surface of the display device, wherein the first layer comprises a WebGL canvas supporting the multiple instances of 3D content, wherein a second layer of the at least two layers is associated with two-dimensional (2D) content rendered on the surface of the display device, wherein the first and second layers are rendered on the surface of the display device in an overlapping manner and at substantially the same time, and wherein a mapping between layout position in pixels on the webpage and virtual 3D positions in a unit of length associated with the WebGL canvas enables positioning of the multiple instances of 3D content relative to the 2D content on the webpage within 2 pixels;
    receive user input from a user input device;
    in response to determining that the user input device is not interacting with the 3D content, interpret the user input based on a 2D mode of interaction; and
    in response to determining that the user input device is interacting with the 3D content, interpret the user input based on a 3D mode of interaction.

2. The non-transitory computer readable memory medium of claim 1,
    wherein the 2D mode of interaction corresponds to a first visual cursor, wherein the 3D mode of interaction corresponds to a second visual cursor.

3. The non-transitory computer readable memory medium of claim 2,
    wherein the second visual cursor comprises a virtual beam rendered to extend from a tip of the user input device.

4. The non-transitory computer readable memory medium of claim 2,
    wherein the first visual cursor comprises a mouse cursor.

5. The non-transitory computer readable memory medium claim 1,
    wherein the program instructions are further executable to:
        track position and orientation of the user input device relative to the surface of the display device; and
        determine an intersection of a virtual beam extending from a tip of the user input device with the surface, wherein the intersection is based on the position and orientation of the user input device.

6. The non-transitory computer readable memory medium claim 5,
    wherein to determine that the user input device is not interacting with the 3D content, the program instructions are further executable to:
        determine that the user input device is directed at 2D content based on the determined intersection.

7. The non-transitory computer readable memory medium of claim 1,
    wherein the first layer is rendered in front of the second layer.

8. The non-transitory computer readable memory medium of claim 1,
    wherein layout of the first layer is specified in a unit of length, wherein layout of the second layer is specified in pixels, and wherein the program instructions are further executable to generate the mapping between the unit of length and pixels.

9. The non-transitory computer readable memory medium of claim 1, wherein the mapping accounts for a scroll offset of the webpage via movement of a virtual camera, wherein the movement of the virtual camera corresponds to the scroll effect.

10. The non-transitory computer readable memory medium of claim 9, wherein the scroll offset is specified in pixels and the movement of the virtual camera is specified in a unit of length comprising at least one of meters, centimeters, or inches.

11. A three-dimensional (3D) stereoscopic display system comprising:
    at least one processor;
    one or more displays, coupled to the at least one processor; and
    a memory coupled to the at least one processor, wherein the memory has stored thereon instructions executable by the at least one processor to:
        render, on a surface of at least one display of the one or more displays, a webpage comprising at least two layers, wherein a first layer of the at least two layers is associated with three-dimensional (3D) content rendered on the surface of the at least one display, wherein the first layer comprises a WebGL canvas, wherein a second layer of the at least two layers is associated with two-dimensional (2D) content rendered on the surface of the at least one display, wherein the first and second layers are rendered on the surface of the at least one display at substantially the same time, and wherein a mapping between layout position in pixels on the webpage and virtual 3D positions in a unit of length associated with the WebGL canvas enables positioning of the 3D content relative to the 2D content on the webpage within 2 pixels;
        receive user input from a user input device;
        in response to determining that the user input device is not interacting with the 3D content, interpret the user input based on a 2D mode of interaction; and
        in response to determining that the user input device is interacting with the 3D content, interpret the user input based on a 3D mode of interaction.

12. The system of claim 11,
    wherein the 2D mode of interaction corresponds to a first visual cursor, wherein the 3D mode of interaction corresponds to a second visual cursor.

13. The system of claim 12,
    wherein the first visual cursor comprises a mouse cursor;
    wherein the second visual cursor comprises a virtual beam rendered to extend from a tip of the user input device.

14. The system of claim 11,
    wherein the program instructions are further executable to:
        receive, from a tracking system in communication with the system, position and orientation of the user input device relative to the surface of the display device; and
        determine an intersection of a virtual beam extending from a tip of the user input device with the surface, wherein the intersection is based on the position and orientation of the user input device.

15. The system of claim 14,
wherein to determine that the user input device is not interacting with the 3D content, the program instructions are further executable to:
determine that the user input device is directed at 2D content based on the determined intersection.

16. The system of claim 11,
wherein the first layer is rendered in front of the second layer.

17. The system of claim 11,
wherein layout of the first layer is specified in a unit of length, wherein layout of the second layer is specified in pixels, and wherein the program instructions are further executable to generate the mapping between the unit of length and pixels.

18. A method for displaying a stereoscopic three-dimensional (3D) webpage overlay, comprising:
rendering, on a surface of a display device, a webpage comprising at least two layers, wherein a first layer of the at least two layers is associated with three-dimensional (3D) content rendered on the surface of the display device, wherein the first layer comprises a WebGL canvas, wherein a second layer of the at least two layers is associated with two-dimensional (2D) content rendered on the surface of the display device, wherein the first and second layers are rendered on the surface of the display device at substantially the same time, wherein the first layer is rendered on top of the second layer, and wherein a mapping between layout position in pixels on the webpage and 3D positions in a unit of length associated with the WebGL canvas enables positioning of the 3D content relative to the 2D content on the webpage within 2 pixels;
receiving user input from a user input device;
in response to determining that the user input device is not interacting with the 3D content, interpreting the user input based on a 2D mode of interaction; and
in response to determining that the user input device is interacting with the 3D content, interpreting the user input based on a 3D mode of interaction.

19. The method of claim 18,
wherein the 2D mode of interaction corresponds to a first visual cursor, wherein the 3D mode of interaction corresponds to a second visual cursor.

20. The method of claim 19,
wherein the first visual cursor comprises a mouse cursor;
wherein the second visual cursor comprises a virtual beam rendered to extend from a tip of the user input device.

* * * * *